(12) United States Patent
Lieberman et al.

(10) Patent No.: US 10,006,191 B1
(45) Date of Patent: Jun. 26, 2018

(54) FILL VALVE SWITCH

(71) Applicants: Stu Lieberman, Boynton Beach, FL (US); Geoffrey Schoonmaker, Rolla, MO (US)

(72) Inventors: Stu Lieberman, Boynton Beach, FL (US); Geoffrey Schoonmaker, Rolla, MO (US)

(*) Notice: Subject to any disclaimer, the term of this patent is extended or adjusted under 35 U.S.C. 154(b) by 0 days. days.

(21) Appl. No.: 15/629,026

(22) Filed: Jun. 21, 2017

Related U.S. Application Data

(60) Provisional application No. 62/353,742, filed on Jun. 23, 2016, provisional application No. 62/476,804, filed on Mar. 26, 2017.

(51) Int. Cl.
| | |
|---|---|
| *F16K 21/18* | (2006.01) |
| *E03D 1/33* | (2006.01) |
| *E03D 1/32* | (2006.01) |
| *F16K 31/26* | (2006.01) |
| *E03D 1/14* | (2006.01) |

(52) U.S. Cl.
CPC .................. *E03D 1/33* (2013.01); *E03D 1/32* (2013.01); *F16K 21/18* (2013.01); *F16K 31/265* (2013.01); *A47L 2501/01* (2013.01); *A47L 2501/02* (2013.01); *E03D 2001/147* (2013.01); *Y10T 137/7326* (2015.04); *Y10T 137/7358* (2015.04)

(58) Field of Classification Search
CPC ......... Y10T 137/7365; Y10T 137/7358; Y10T 137/7323; Y10T 137/7326; Y10T 137/7439; E03D 1/33; E03D 1/32; E03D 2001/147; F16K 21/18; F16K 31/265; A47L 2501/01; A47L 2501/02
See application file for complete search history.

(56) References Cited

U.S. PATENT DOCUMENTS

| | | | |
|---|---|---|---|
| 2,059,749 A * | 11/1936 | Rosewood | ................ E03D 1/30 137/398 |
| 2,841,169 A | 7/1958 | Martin et al. | |
| 4,170,049 A * | 10/1979 | Gilliland | ................ E03D 11/00 137/398 |
| 4,843,657 A | 7/1989 | Orr | |
| 4,901,377 A | 2/1990 | Weir | |
| 6,112,763 A * | 9/2000 | Orbell | ..................... E03D 1/145 137/398 |
| 6,370,708 B1 * | 4/2002 | Sitarz | ........................ E03D 1/01 137/410 |
| 6,837,264 B1 | 1/2005 | Schuster | |
| 8,166,996 B2 | 5/2012 | Canfield | |
| 2008/0035206 A1 * | 2/2008 | Le | ............................ E03D 1/32 137/15.19 |
| 2010/0212756 A1 * | 8/2010 | Guthrie | ..................... E03D 1/32 137/409 |

(Continued)

*Primary Examiner* — Jessica Cahill
(74) *Attorney, Agent, or Firm* — David Grossman

(57) ABSTRACT

A shelf is arranged to pivot about a pivot zone. The shelf has a center of gravity offset from the pivot zone. The shelf has a first angular range about the pivot zone configured to situate a linkage in a valve activation position. The shelf has a second angular range about the pivot zone mechanically configured to situate the linkage in a valve de-activation position. An interaction portion is mechanically configured to urge the shelf from the first angular range to the second angular range by a float moving in a first direction.

18 Claims, 23 Drawing Sheets

(56) References Cited

U.S. PATENT DOCUMENTS

| | | | | |
|---|---|---|---|---|
| 2012/0318382 A1* | 12/2012 | Magar | ............... | E03D 1/00 |
| | | | | 137/409 |
| 2013/0074953 A1* | 3/2013 | Huang | ............... | E03D 1/32 |
| | | | | 137/409 |
| 2014/0345703 A1* | 11/2014 | Han | ............... | E03D 1/32 |
| | | | | 137/15.18 |
| 2015/0034177 A1* | 2/2015 | Kim | ............... | F16K 37/0033 |
| | | | | 137/438 |
| 2017/0211264 A1* | 7/2017 | Marsic | ............... | E03D 1/36 |

\* cited by examiner

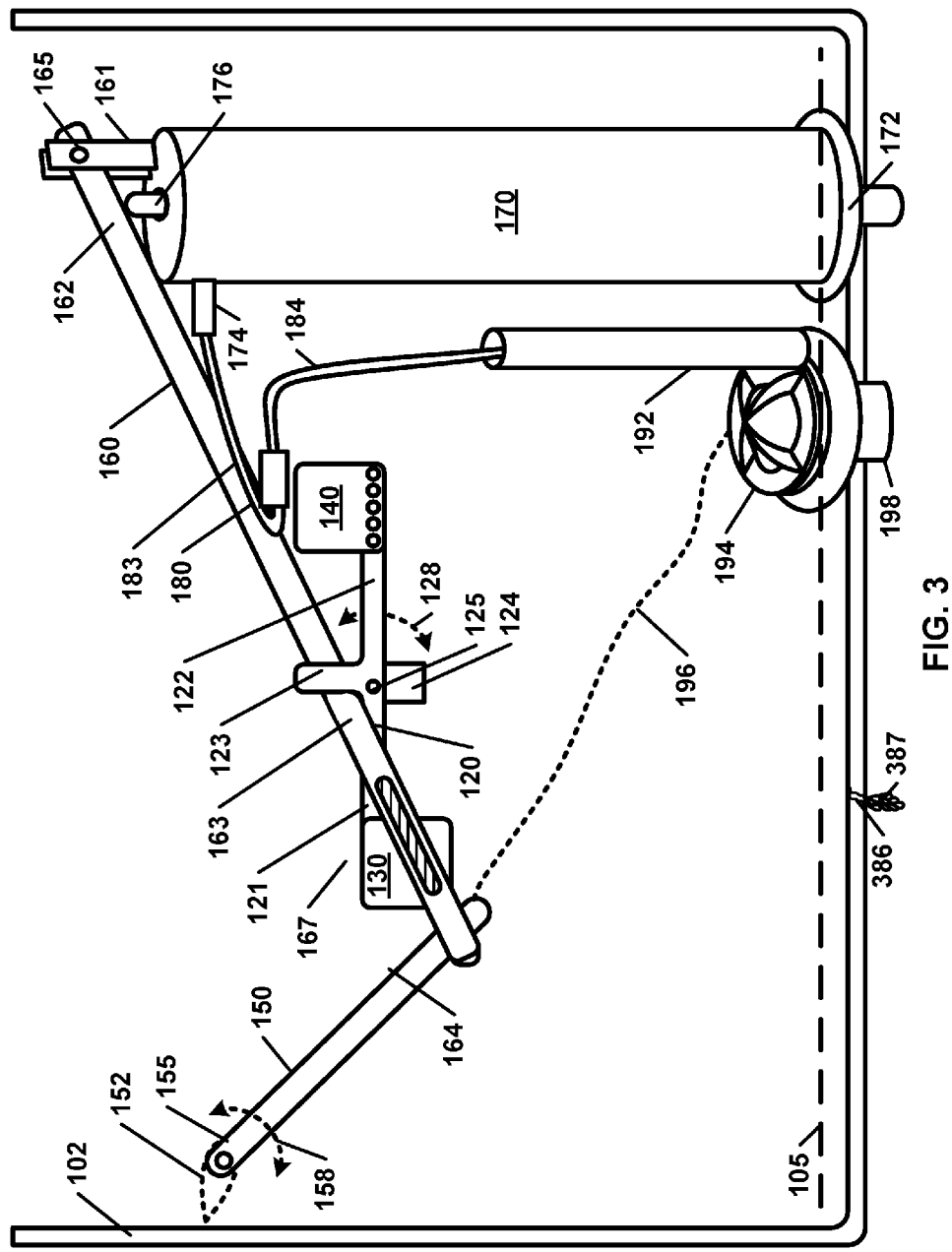

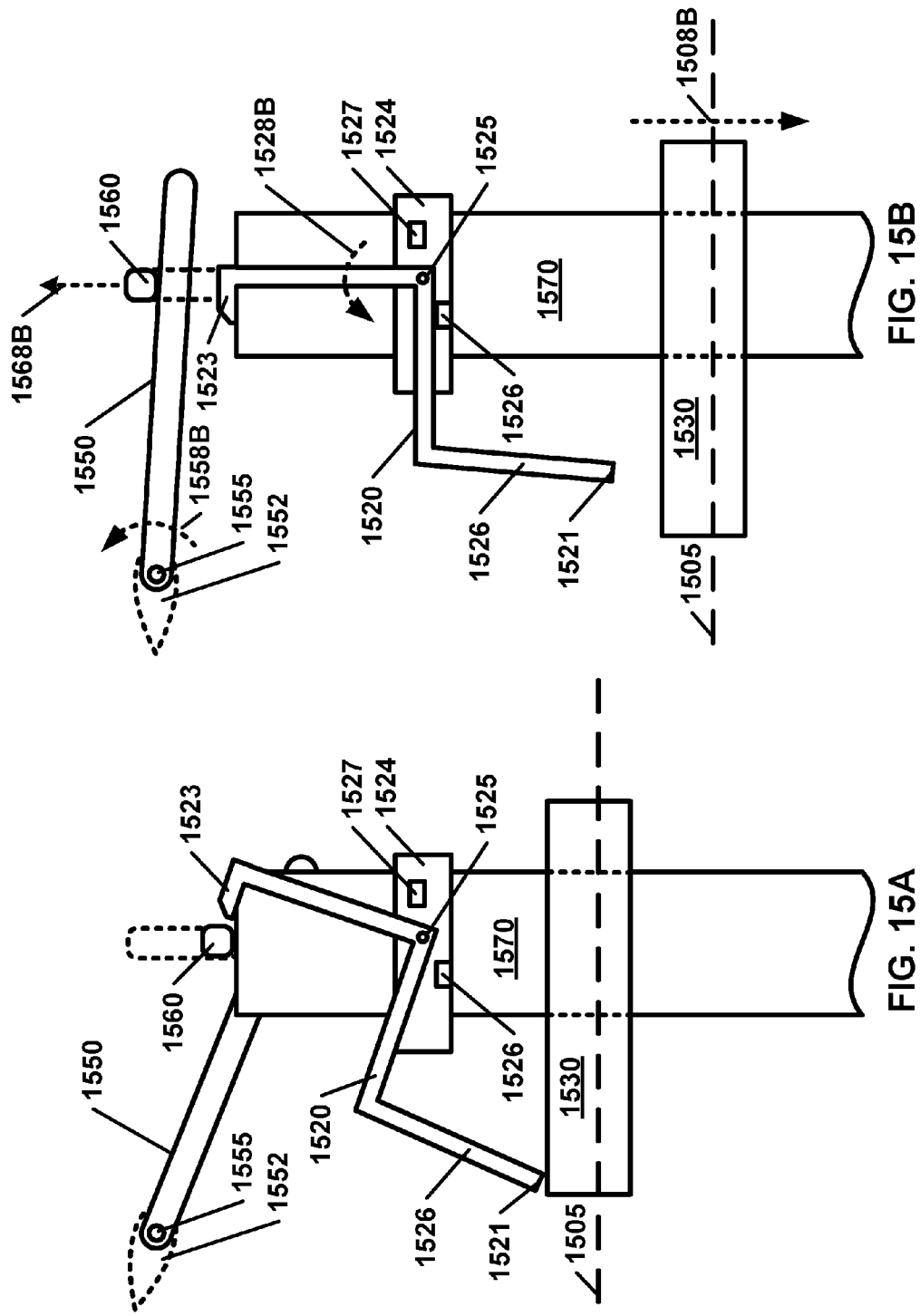

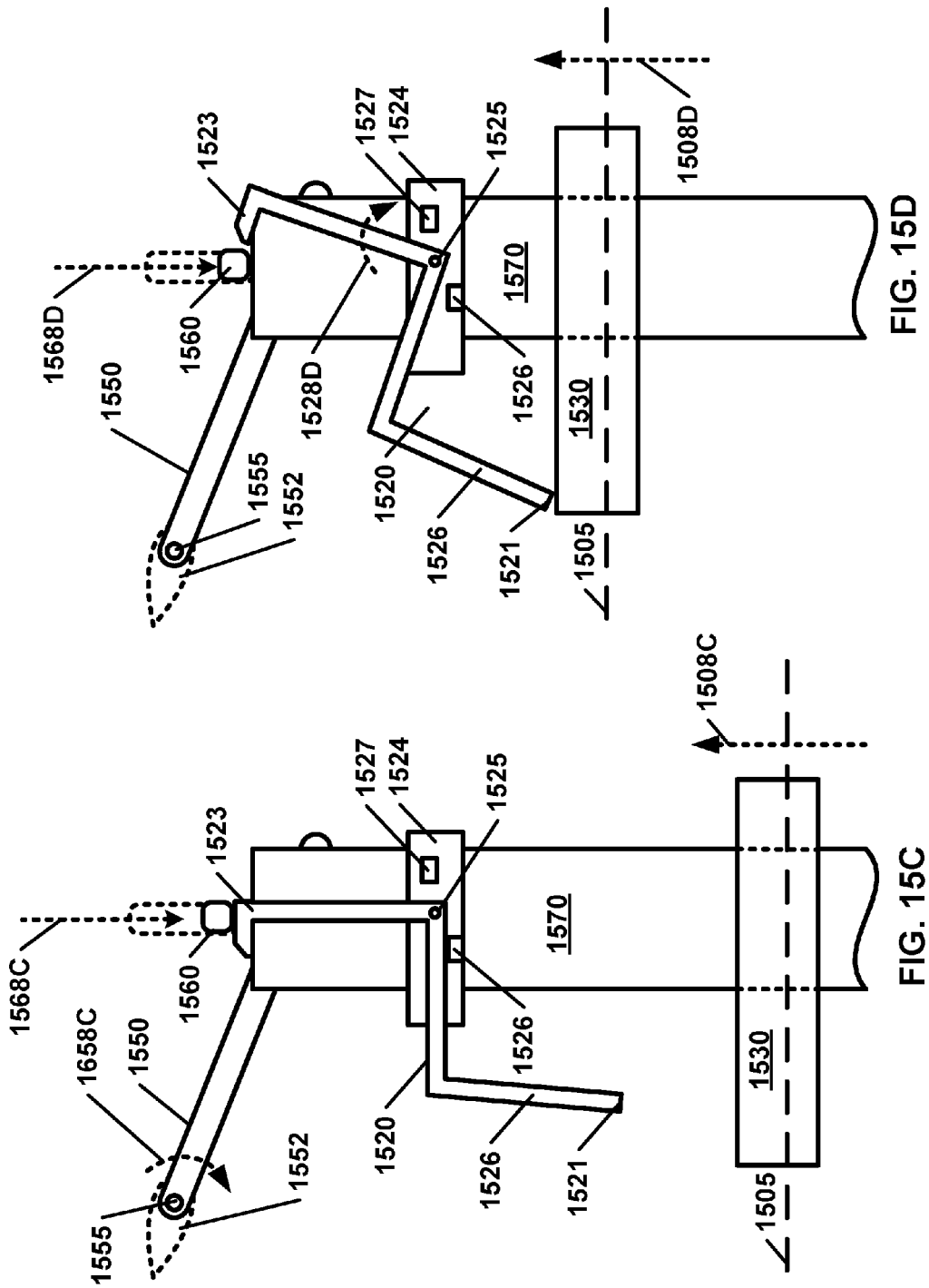

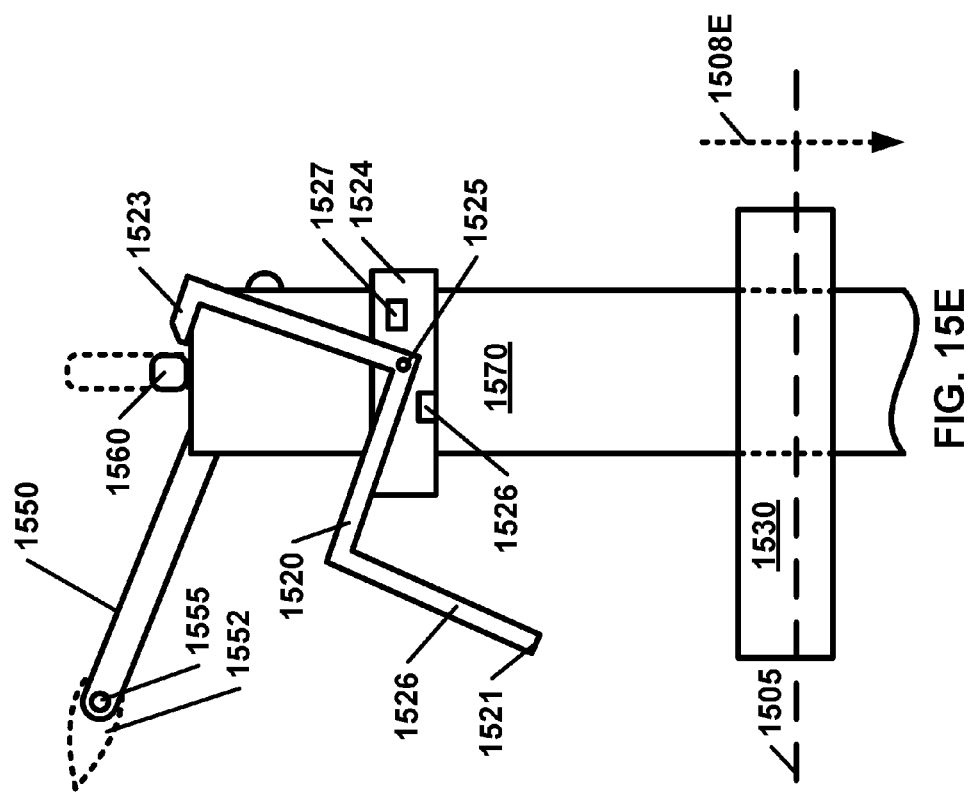

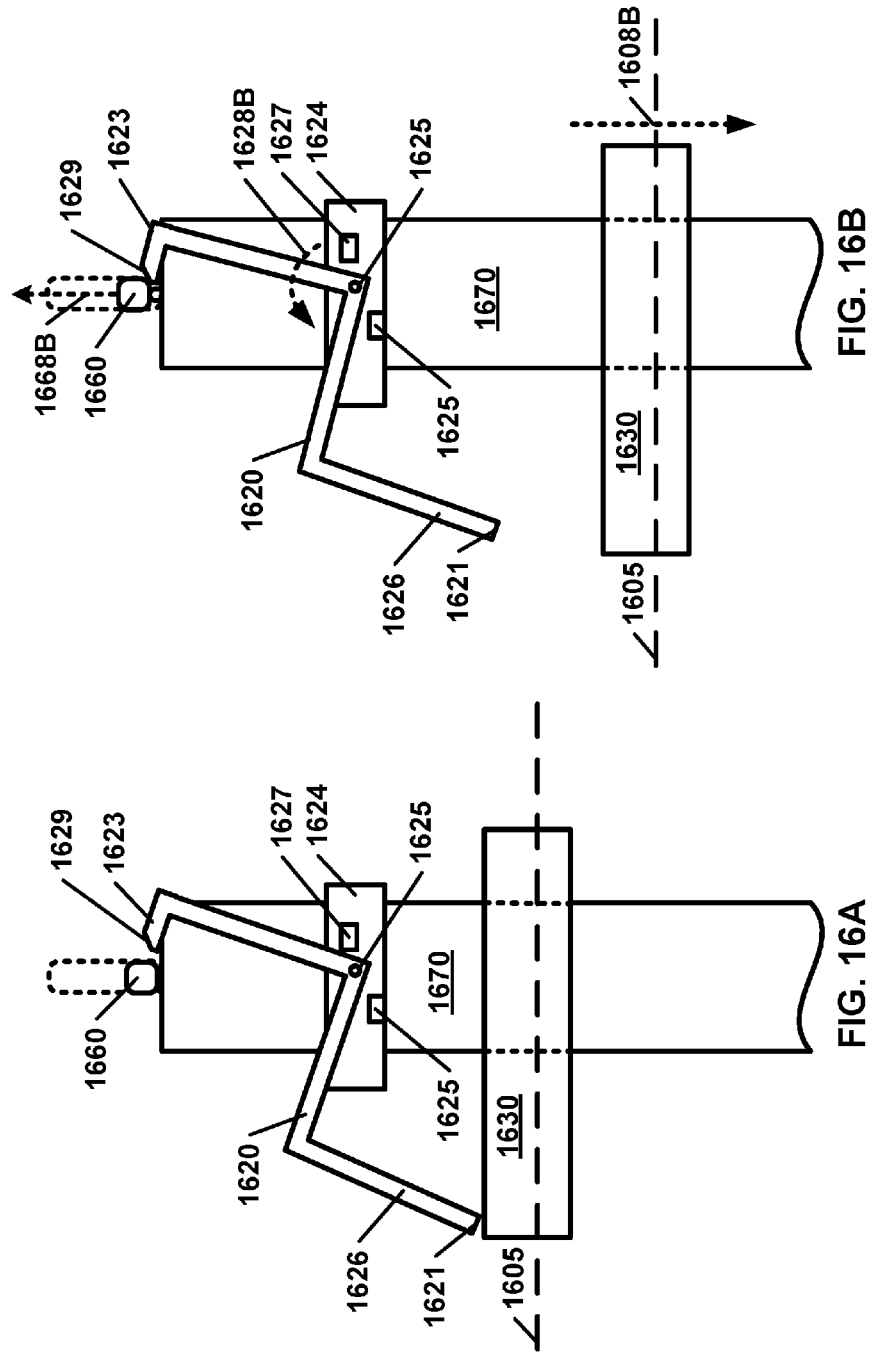

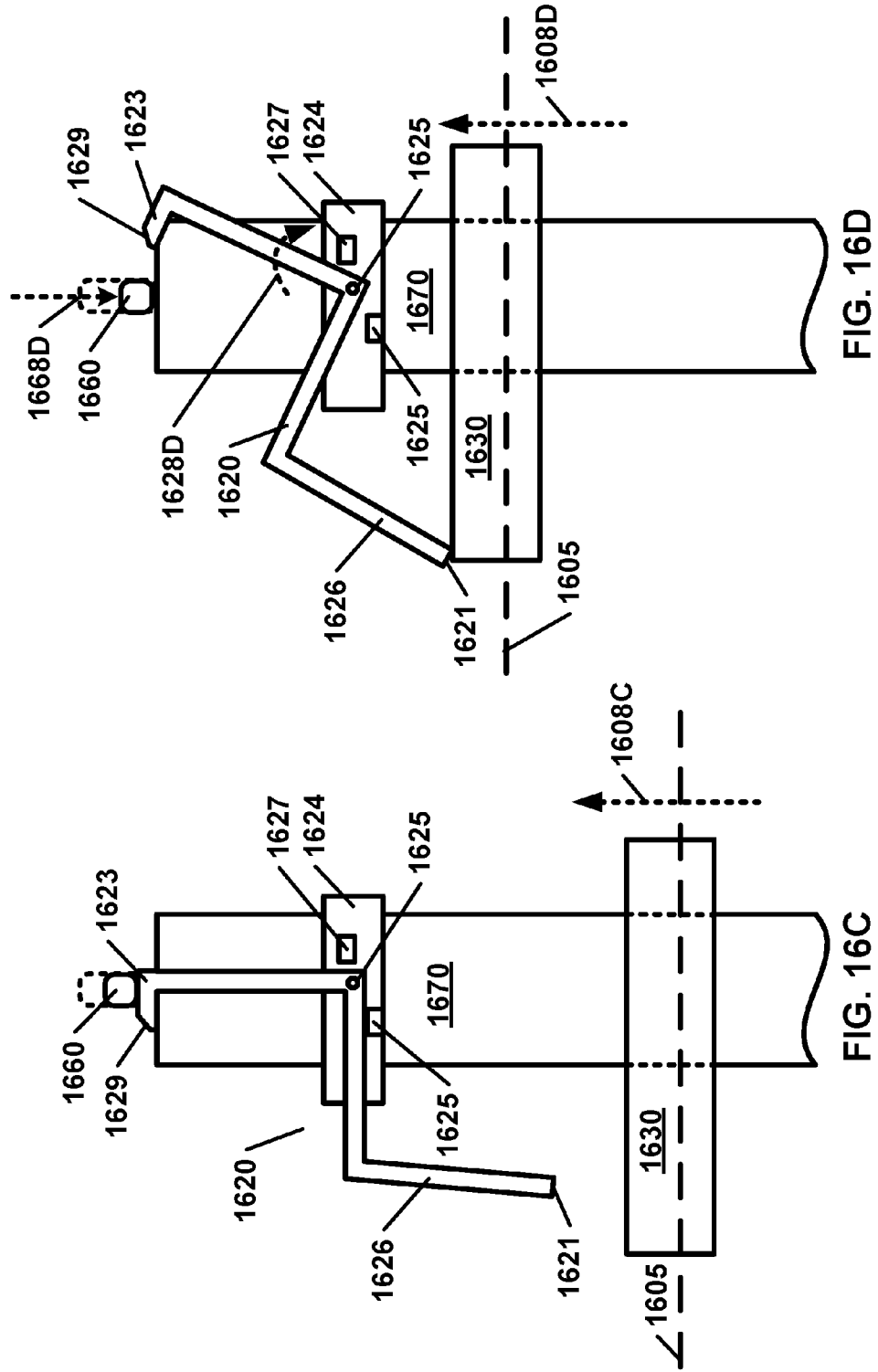

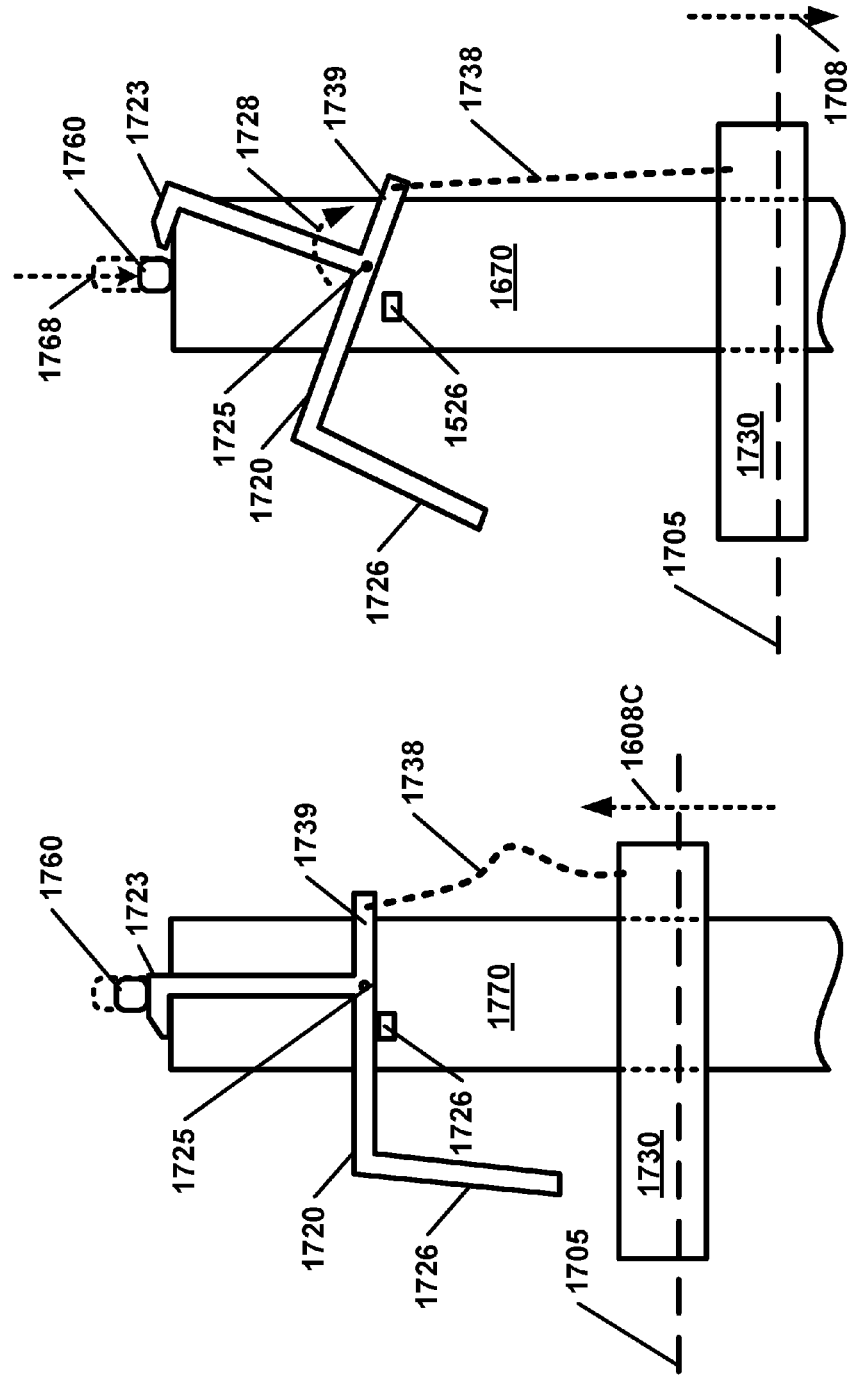

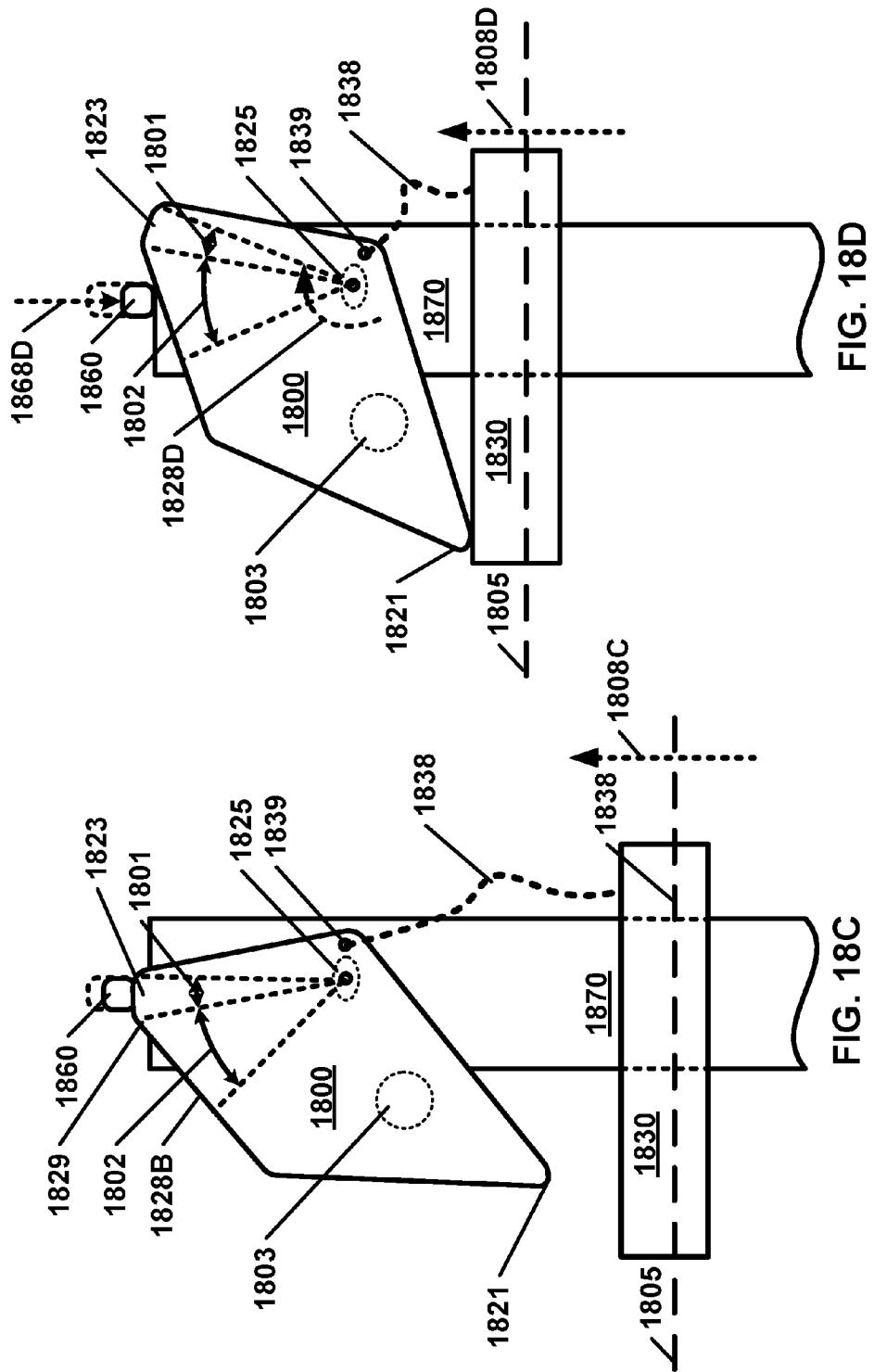

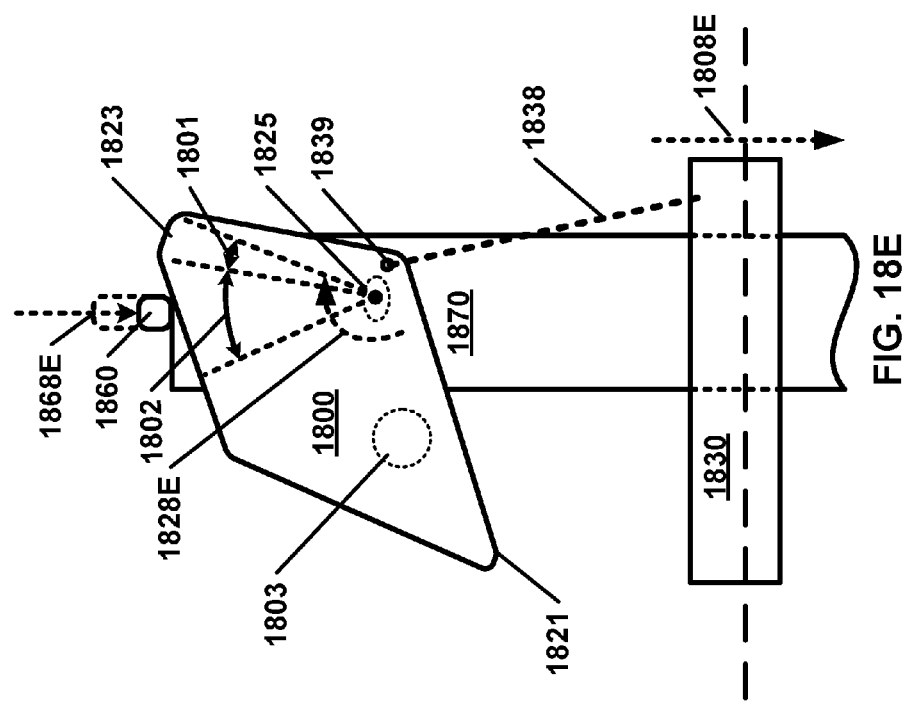

FILL VALVE SWITCH

CROSS-REFERENCE TO RELATED APPLICATIONS

This application claims the benefit of U.S. Provisional Application No. 62/353,742, filed Jun. 23, 2016, and U.S. Provisional Application No. 62/476,804, filed Mar. 26, 2017, which are hereby incorporated by reference in its entirety.

BACKGROUND OF THE INVENTION

A significant amount of water may be lost daily when a cistern (e.g. a toilet) has a leak and/or is clogged while a fill valve is left open. What is needed is a device that keep a fill valve in a cistern (e.g. toilet) closed between cistern flushing cycles.

BRIEF DESCRIPTION OF THE SEVERAL VIEWS OF THE DRAWINGS

FIG. 3 is an example illustration of a front view of a fill valve switch in a leaking flush tank as per an aspect of an embodiment of the present invention.

FIG. 15A is an example illustration of a fill valve with a switch and trigger mechanism in a nominal position as per an aspect of an embodiment of the present invention.

FIG. 15B is an example illustration of a fill valve with a switch and trigger mechanism in a first flushing position as per an aspect of an embodiment of the present invention.

FIG. 15C is an example illustration of a fill valve with a switch and trigger mechanism in a second flushing position as per an aspect of an embodiment of the present invention.

FIG. 15D is an example illustration of a fill valve with a switch and trigger mechanism in a tank fill completion position as per an aspect of an embodiment of the present invention.

FIG. 15E is an example illustration of a fill valve with a switch and trigger mechanism in a tank leak position as per an aspect of an embodiment of the present invention.

FIG. 16A is an example illustration of a fill valve with a switch and trigger mechanism in a nominal position as per an aspect of an embodiment of the present invention.

FIG. 16B is an example illustration of a fill valve with a switch and trigger mechanism in a first flushing position as per an aspect of an embodiment of the present invention.

FIG. 16C is an example illustration of a fill valve with a switch and trigger mechanism in a second flushing position as per an aspect of an embodiment of the present invention.

FIG. 16D is an example illustration of a fill valve with a switch and trigger mechanism in a tank fill completion position as per an aspect of an embodiment of the present invention.

FIG. 17A is an illustration of an example embodiment of a backup closer as per an aspect of the disclosure.

FIG. 17B is an illustration of an example embodiment of a backup closer as per an aspect of the disclosure.

FIG. 18C is an illustration of an example fill valve with a switch and trigger mechanism in a second flushing position.

FIG. 18D is an illustration of an example fill valve with a switch and trigger mechanism in a tank fill completion position.

FIG. 18E is an illustration of an example fill valve 1870 with a switch and trigger mechanism in a backup closed position.

DETAILED DESCRIPTION OF EMBODIMENTS

Embodiments of the present invention are configured to keep a fill valve in a cistern (e.g. toilet) closed between flushing cycles.

According to an embodiment, an apparatus may be configured to shut off a fill valve in response to cistern leak. An arm having a first resting position and a second resting position may be linked to a fill valve actuator. The fill valve actuator may close the fill valve when the arm is in the first resting position. A lifting arm may lift the arm from the first resting position to the second resting position on a shelf. The shelf may be linked to the motion of a beam. The beam may rotate between a first beam position and a second beam position in response to the location of a float. The arm may be configured to move from the second resting position to the first resting position when: the arm is in the second resting position; and the beam moves from the second beam position towards the first beam position.

Figure 1:
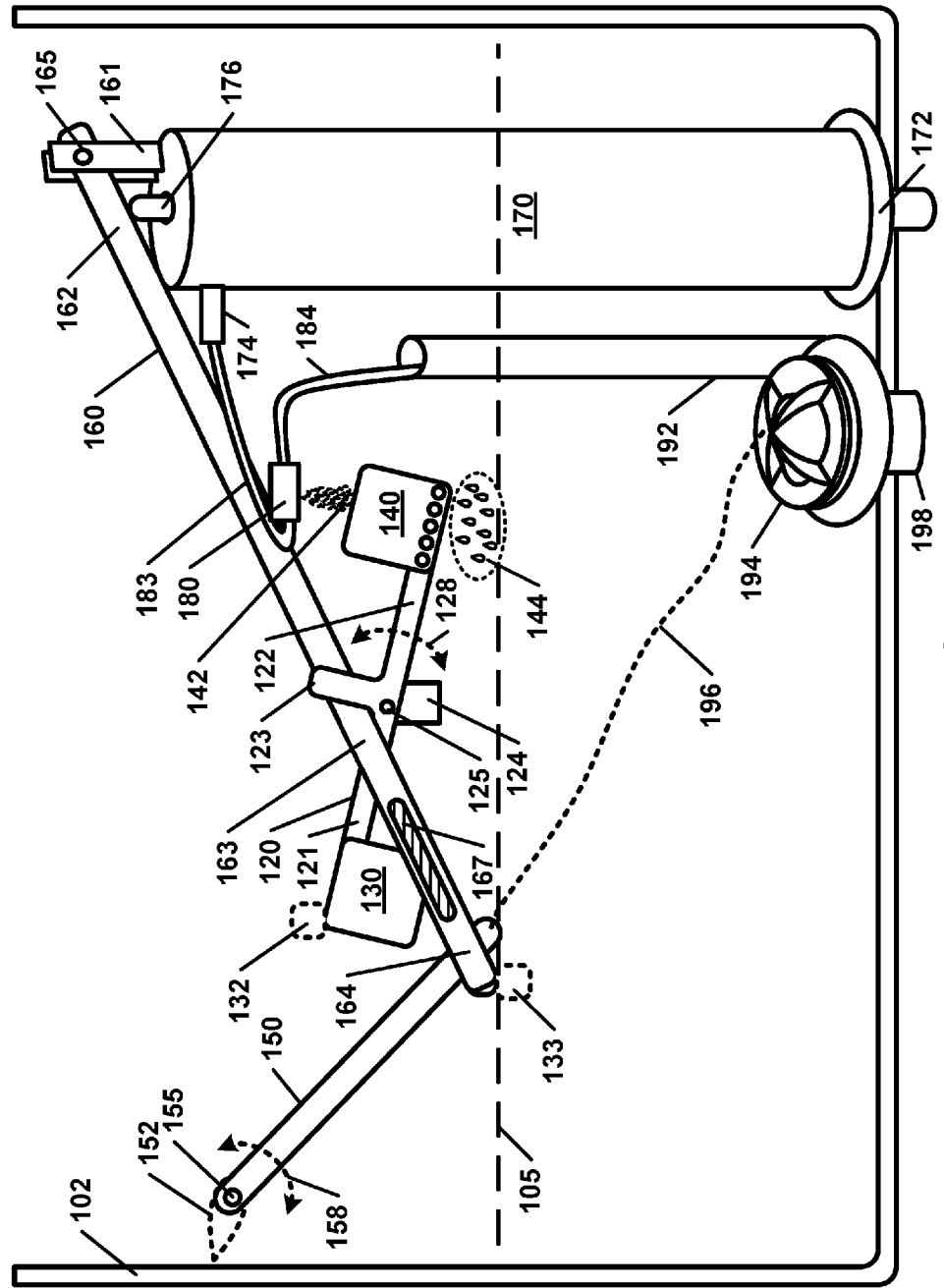
FIG. 1 is an example illustration of a front view of a fill valve switch in a flush tank as per an aspect of an embodiment of the present invention.
Figure 2A:
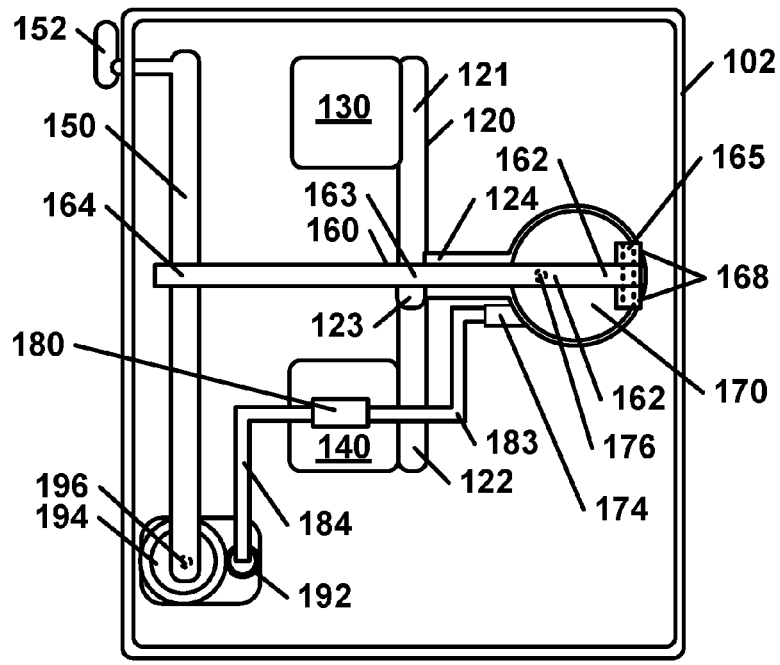
FIG. 2A is an example illustration of a top view of a fill valve switch in a flush tank as per an aspect of an embodiment of the present invention.
Figure 2B:
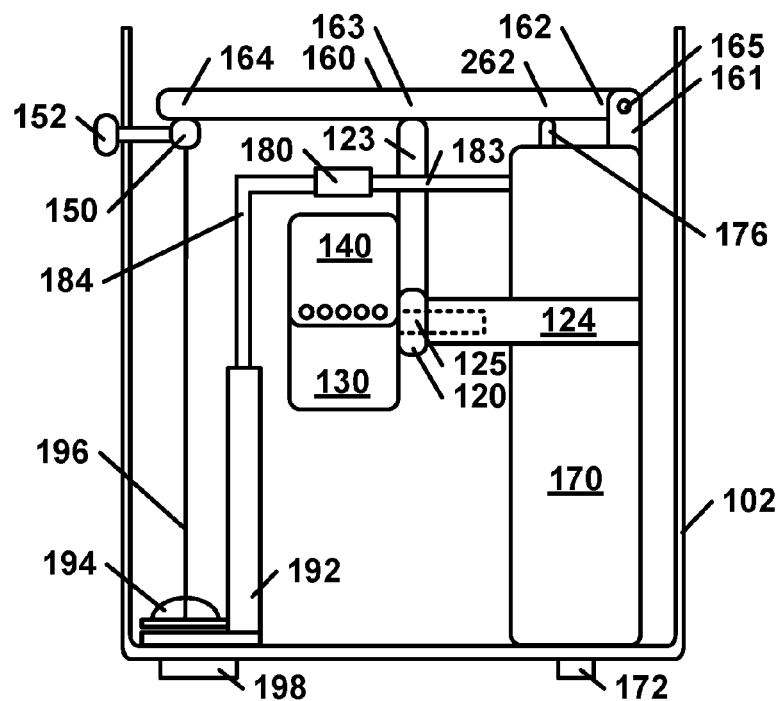
FIG. 2B is an example illustration of a side view of a fill valve switch in a flush tank as per an aspect of an embodiment of the present invention.

According to an embodiment, a shelf may be arranged to pivot about a pivot zone. The shelf may have a center of gravity offset from the pivot zone. The shelf may have a first angular range configured to situate a linkage in a valve activation position. The shelf may have a second angular range configured to situate the linkage in a valve de-activation position. An interaction portion of the shelf may be configured to urge the shelf from the first angular range to the second angular range by a float moving in a first direction. The shelf may be further configured to rotate from the second angular range to the first angular range by a righting momentum achieved by the shelf rotating about the pivot zone after the float is moved in a second direction FIG. 1 is an example illustration of a front view of a fill valve switch apparatus in a flush tank 102 (also referenced as a cistern) as per an aspect of an embodiment of the present invention. FIG. 2A is an example illustration of a top view of a fill valve switch in a flush tank 102 as per an aspect of an embodiment of the present invention. FIG. 2B is an example illustration of a side view of a fill valve switch in a flush tank as per an aspect of an embodiment of the present invention. These figures illustrate some of the various elements of an embodiment. The position of the elements in operation are described with respect to later figures. The example apparatuses illustrated in FIG. 1, FIG. 2A, and FIG. 2B comprise a first support 161, a beam 120, a shelf 123, and an arm 160.

The first support 161 may be proximate to a fill valve 170. The fill valve 170 may comprise a fill valve activator 176. The fill valve actuator 176 may comprise an open position and a closed position. The open position may be configured to cause the fill valve 170 to pass liquid from an inlet 172 to an outlet 174. The closed position may be configured to prevent the fill valve 170 from passing liquid from the inlet 172 to the outlet 174.

The beam 120 may be connected to a beam support 124 at a beam pivot point 125. The beam 120 may be configured to pivot (128) between a first beam position and a second beam position. The beam 120 may comprise a first beam portion 121 configured to be lifted by a float 130 on a first side of the beam pivot point 125 According to an embodiment, the beam support 124 may be positioned above a tank water line 105.

The shelf 123 may be offset from the length of the beam 120 and linked to the motion of the beam 120. The linkage may be direct. For example, as shown in FIG. 1, the shelf 123 is a perpendicular element rising from the length of the beam 120 and therefore is configured to rotate with the movement of beam 123. However, alternative linkages may be employed. For example, a shelf may pivot about its own pivot point and be linked to beam 120 via, for example, a chain, a bar, combinations thereof, and/or the like. The shelf may be linked to the beam 120 via sensor configured to monitor the movement of the beam 120 in combination with an actuator configured to move the shelf. According to various embodiments, actuators and sensors may be electrical and/or mechanical.

The arm 160 may be connected to the first support 161 at an arm pivot point 165. The arm 160 may extend from the arm pivot point 165 in the proximate direction of the beam 120 and shelf 123. The arm 160 may comprise a resting portion 163 configured to rest on at least the shelf 123. Depending upon the position of the arm 160 at any particular time, the resting portion 163 may sometimes rest on the beam 120 and may sometimes not rest on other elements.

The arm 160 may comprise a first arm lift portion 164 configured to be lifted by a lifting arm 150 from a first resting position to a second resting position on the shelf. The arm 160 may comprise an engagement portion 162 configured to place the fill valve actuator 176 in: the open position when the arm 160 is in the second resting position; and the closed position when the arm 160 is in the first resting position. The arm 160 may be configured to move from the second resting position to the first resting position when: the arm 160 is in the second resting position; and the beam 120 moves from the second beam position towards the first beam position.

According to an embodiment, the apparatus may further comprise a weight 167 attached to the arm 160. The weight 167 may be configured to apply a gravitational downward force at the resting portion 163 of the arm 160. The weight 167 may be another element that is attached to the arm 160. The weight 167 may be molded into arm 160. The weight may be attached externally to arm 160. According to an embodiment, the resting portion 163 may be heavier than the engagement portion 162. This may be achieved by varying material with different densities and/or volumes when constructing arm 160. The may also be achieved by varying the shape of arm 160. The effective weight of a portion of arm 160 may be adjusted by the distance that a weighted portion is positioned with respect to the arm pivot point 165.

According to an embodiment, the engagement portion 162 may extend over the valve actuator 176. According to an embodiment, the engagement portion 162 may place the fill valve actuator 176 in the open position through positive contact pressure. According to an embodiment, the engagement portion 162 may place the fill valve actuator 176 in the closed position through a removal of positive contact pressure.

According to an embodiment, the apparatus may further comprise a beam motion limiter (i.e. 132). The beam motion limited may be configured/located to limit the pivoting motion (128) of beam 120. Beam motion limiter (i.e. 132) may be disposed to contact beam 120 at positions that may come into contact with a portion of beam 120 and/or other element connected to beam 120 (e.g. float 130 and/or leaky container 140). So for example, a beam motion limiter (i.e. 132) may be disposed in the path of float 140. Beam motion limiter (i.e. 132) may be disposed above and/or below beam 120. According to an embodiment, the apparatus may further comprise a beam motion limiter adjuster that may be configured to adjust the position of a beam motion limiter (i.e. 132) with respect to beam 120.

According to an embodiment, the apparatus may further comprise an arm motion limiter (i.e. 133). The beam motion limited may be configured/located to limit the pivoting motion of arm 160. Arm motion limiter (i.e. 133) may be disposed to contact arm 160 at positions that may come into contact with a portion of arm 160 and/or other element connected to arm 160 (e.g. weight 167). So for example, a arm motion limiter (i.e. 133) may be disposed in the path of weight 167. arm motion limiter (i.e. 133) may be disposed above and/or below arm 160. According to an embodiment, the apparatus may further comprise an arm motion limiter adjuster that may be configured to adjust the position of the arm motion limiter (i.e. 133) with respect to arm 160.

According to an embodiment, the apparatus may further comprise a float height adjuster configured to adjust the height of a float (e.g. 140) relative to a portion of beam (e.g. 120) such as first beam portion (e.g. 121).

According to an embodiment, beam 120 may comprise a second beam portion (122) on a second side of the beam pivot point 125.

According to an embodiment, the apparatus may comprise a beam height adjuster configured to adjust the height of the beam pivot point 125 relative to the height of the arm pivot point 165. This adjustment may be employed to adjust the trip position of the arm 160 when resting on shelf 123 with respect to activating fill actuator 176.

According to an embodiment, the apparatus may further comprise a second beam portion 122 on a second side of the beam pivot point 125 in combination with a leaky container 140 connected to the second beam portion 122. The leaky container 140 may be configured to allow liquid 144 to flow out of the leaky container 140 at various rates. For example, the leaky container 140 may comprise perforations sized to allow liquid 144 to flow out of the leaky container 140. The rate of flow may be based on the size of perforations in leaky container 140. According to an embodiment, the rate of flow of liquid 144 from the leaky container 140 may be adjusted to adapt to a rate of liquid 142 diverted from the fill valve 170 outlet 174 when the fill valve 170 is in an open position. For example, the leaky container 140 may comprise a leaky container flow adjuster (now shown). A leaky container flow adjuster may comprise a mechanism that blocks flow of liquid through, for example, the perforations. It is expected that alternative embodiments may enable the flow 144 to be adjusted in other ways. For example, flow of liquid 144 out of leaky container 140 may be adjusted via a valve, via an absorbent material, combinations thereof, and/or the like.

According to an embodiment, the apparatus may further comprise a leaky container height adjuster configured to adjust the height of the leaky container 140 relative to the second beam portion 122. This adjustment may be employed to set the height of the leaky container 140 relative to the fill level 105, for example, when the fill level reaches (and/or exceeds) a predetermined level.

According to an embodiment, the apparatus may further comprise a beam motion limiter (e.g. 132) disposed in the path of the leaky container 140. This beam motion limiter (e.g. 132) may have the effect of limiting the rotation (128) of beam 120 when there is a linkage between the position of leaky container 140 and beam 120.

According to an embodiment, the apparatus may further comprise a diverter 180 configured to divert a portion of liquid 142 from the outlet 174 to leaky container 140. Diverter 180 may comprise a splitter that directs some of the liquid 142 from outlet 174 to flow into leaky container 140 and directs some of the liquid from outlet 174 to flow into another location (as illustrated with tube 184) such as: for example, the cistern, an overflow pipe 192, out of the cistern, combinations thereof, and/or the like. As the diverted liquid 142 flows from diverter 180 into leaky container 140, leaky container 140 may gain weight and cause beam 120 to pivot about beam pivot point 125. When the rate of the diverted liquid 142 is greater than the rate of liquid 144 escaping the leaky container 140, the leaky container 140 may gain weight causing beam 120 to pivot about beam pivot point 125 so that the first beam portion 121 is raised relative to the second beam portion 122. When the rate of the diverted liquid 142 is less than the rate of liquid 144 escaping the leaky container 140, the leaky container 140 may gain weight causing beam 120 to pivot about beam pivot point 125 so that the first beam portion 121 is raised relative to the second beam portion 122.

According to an embodiment, the apparatus may further comprise a diverter flow adjuster configured to adjust the percentage of liquid diverted 142 from the outlet 174 to the leaky container 140. The rate of flow of the diverted liquid 142 may be based on the diverted flow adjuster setting. The rate of flow of liquid 144 from leaky container 140 may be adjusted to adapt the rate of liquid diverted 142 from the fill valve 170 outlet 174 when the fill valve 170 is in an open position. For example, the diverter flow adjuster may comprise a mechanism that blocks flow of liquid through, for example, the perforations. It is expected that alternative embodiments may enable the diverted flow 142 to be adjusted in other ways. For example, diverted flow 142 may be adjusted via a valve, via an absorbent material, combinations thereof, and/or the like.

According to an embodiment, the apparatus may further comprise a diverter flow adjuster configured to adjust the amount of liquid 142 directed toward the leaky container and the amount of liquid directed towards an alternative location (e.g. via tube 184). The diverter flow adjuster may divert liquid 142 from the outlet 174 to the leaky container 140 based, at least in part, on the level of the water 105 in the tank 102. Therefore, embodiments of the flow diverter may comprise a float based switch, a valve, a diverter-diverter, a liquid blocker, a combination thereof, and/or the like. For example, an embodiment may comprise a second float disposed near the bottom of tank configured to prevent a quantity of liquid from flowing into the leaky container 140.

According to an embodiment, the fill valve 170 may comprise a silent fill toilet cistern inlet valve. A silent fill toilet cistern inlet valve is a type of inlet valve referred to as silent because it is configured to fill a cistern quickly (approximately 30 seconds to one minute) and without significant sounds of rushing and splashing water within the cistern. The silence may be mainly achieved by keeping the outlet of the inlet valve below the water level in the cistern. Silent fill toilet cistern inlet valve(s) may be obtained from Fluid Master, Inc. of San Juan Capistrano Calif. and Lavelle Industries Inc. of Burlington, Wis.

As illustrated in FIG. 1 and according to an embodiment, the first support 161 may be adjacent to fill valve activator 176. The first support 161 may be disposed on the fill valve 170. According to an embodiment, the first support first support (e.g 170) may be attached to a fill valve (e.g. 170) cap. According to an embodiment, the first support (e.g. 1161, 1268) may be attached to a strap (e.g. 1198 and 1298) configured to circumnavigate a vertical portion of the fill valve (e.g. 1170, 1270).

According to an embodiment, the lifting arm 150 may extend from a flush handle 152 towards the arm lift portion 164. The lifting arm 150 may pivot (e.g. 158) about a flushing pivot point 155 in accord with the movement of the flush handle 152. According to an embodiment, the lifting arm 150 may be lifted by a mechanical linkage to an activation mechanism. Examples of activation mechanism(s) comprise a switch, a button, a second handle, a multidirectional handle (i.e. up for a short flush, down for a long flush), a solenoid, a motor, a spring mechanism, combinations thereof, and/or the like. The lifting arm 150 may be connected to flapper 194 via a chain 196, and/or other linkage (e.g. connecting rod). When the lifting arm 150 is rotated (158) upward against arm 160, the linkage 196 may activate the drainage of the cistern by, for example, opening flapper 194 and/or other valve mechanism, so that liquid in the cistern may evacuate the cistern via drain 198.

Whereas FIG. 1 illustrates a cistern being filled (as noted by the liquid 142 flowing from diverter 180 to leaky container 140, FIG. 3 illustrates a similar embodiment in which the cistern has a crack 386 causing a leak 387 of liquid from the cistern. Other causes of leaks may comprise, a leaking flush valve, a flapper, a leaking seal between the tank and fill valve, a leaking seal between the tank and toilet mounting, combinations thereof and/or the like. Leak(s) may prevent the water level 105 from rising, potentially causing a long term leak. However, as illustrated, arm 160 may hold the fill valve actuator 176 in a closed position preventing fill valve 170 from continuously trying to fill the cistern. The operation of this leak abatement embodiment will now be described with the aid of FIG. 4A, FIG. 4B, and FIG. 4C.

Figure 4A:
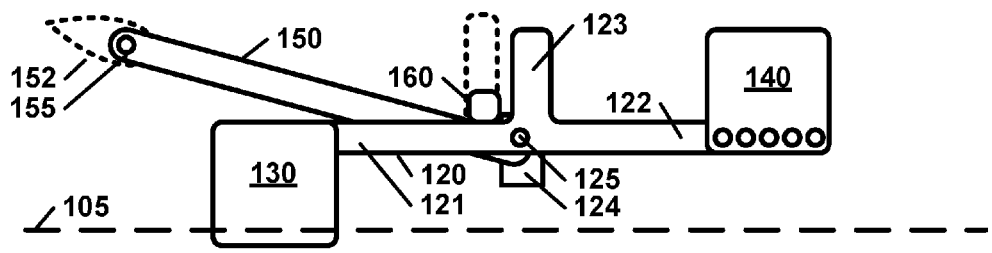
FIG. 4A is an example illustration of a front view of a fill valve switch trigger mechanism in a nominal position as per an aspect of an embodiment of the present invention.
Figure 4B:
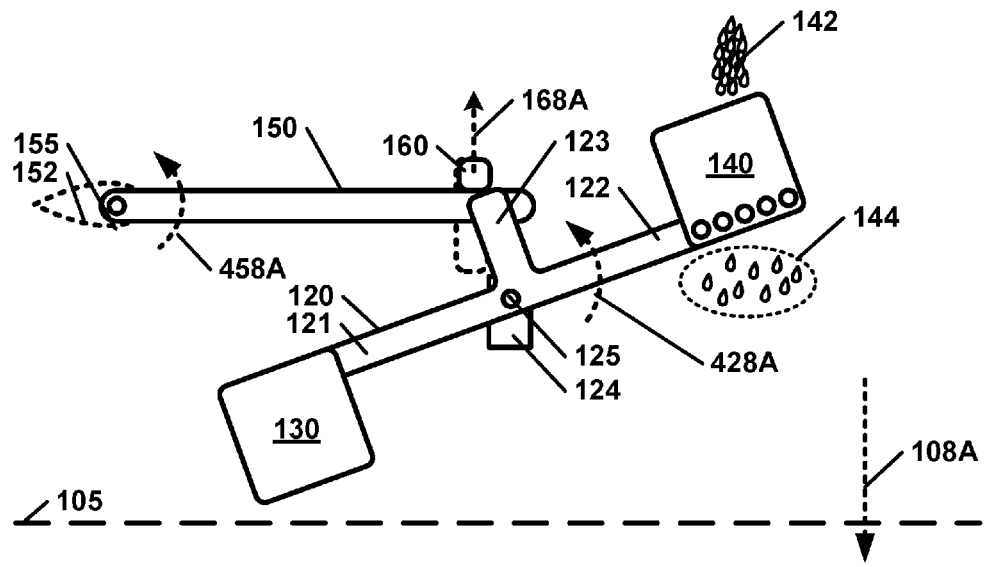
FIG. 4B is an example illustration of a front view of a fill valve switch trigger mechanism in a flushing position as per an aspect of an embodiment of the present invention.
Figure 4C:
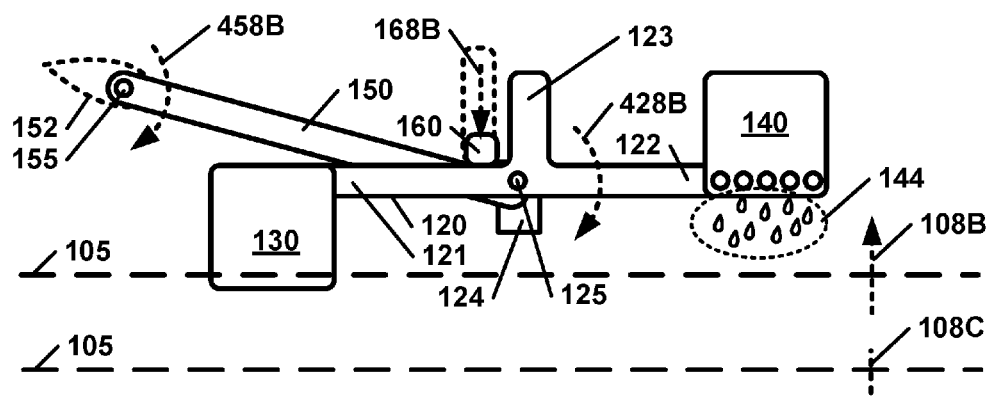
FIG. 4C is an example illustration of a front view of a fill valve switch trigger mechanism in a recently filled position as per an aspect of an embodiment of the present invention.

FIG. 4A is an example illustration of a front view of a fill valve switch trigger mechanism in a nominal position, FIG. 4B is an example illustration of a front view of a fill valve switch trigger mechanism in a flushing position, and FIG. 4C is an example illustration of a front view of a fill valve switch trigger mechanism in a recently filled position. As shown in FIG. 4A, cistern 102 is in a nominal filled flush ready position. Float 130, resting on water level 105, may hold beam 120 in a first position. Arm 160 may be in a first resting position, which in this example, has arm 160 resting on beam 120. In this position, arm 160 may hold fill valve actuator 176 in a closed position, preventing fill valve 170 from delivering additional water into cistern 102.

As illustrated in FIG. 4B, flush handle 152 has been pivoted about flush handle pivot point 155 to cause lifting arm 150 to rotate (458A). Rotation (458A) may cause lift arm 150 to lift (168A) arm 160 out of the way of shelf 123. Water level 105 dropping (108A) may cause beam 123 to rotate (428A) about beam pivot point 125 to place shelf 123 below arm 160. Releasing flush handle 152 may cause arm 160 to settle in a second rest position on shelf 123. Arm 160 in the second rest position may hold the fill valve actuator 176 in an open position allowing liquid to fill cistern 102.

As illustrated in FIG. 4C, the fill valve 170 may attempt to fill the cistern. When the cistern 102 is not leaking, the water level 105 may rise (108B). The water level 105 rising (108B) may cause float 130 to rise up. Float 130 rising may cause beam 120 to rotate (128B). Rotation (128B) may cause shelf 123 to move. Shelf 123 moving may cause arm 160 to move (168B) from the second resting position back to the first resting position. Arm 160 moving from the second resting position back to the first resting position may cause the fill valve actuator 167 to transition from an open position to a closed position. Fill valve actuator 167 transitioning from an open position to a closed position may stop the flow of liquid 142 into cistern 102. Cistern 102 may now be back into the nominal position illustrated in FIG. 4A.

As illustrated in FIG. 4C, the fill valve 170 may attempt to fill cistern 102. When cistern 102 is leaking (as illustrated in FIG. 3), the water level 105 may not rise (108C) as described previously. In this case, float 130 may not rise. However, while the fill valve 170 is in an open position, liquid 142 may flow from diverter 180 into leaky container 140 at a rate that is greater than liquid 144 flowing out of leaky container 140. The differential flow of liquid in (142) and out (144) of leaky container 140 may cause leaky container 140 to gain weight. Leaky container 140 gaining weight may cause beam 120 to rotate (128B). Rotation (128B) may cause shelf 123 to move. Shelf 123 moving may cause arm 160 to move from the second resting position back to the first resting position. Arm 160 moving from the second resting position back to the first resting position may cause the fill valve actuator 167 to transition from the open position to a closed position. Fill valve actuator 167 transitioning from the open position to a closed position may stop the flow of liquid 142 from diverter 180 into leaky container 140. Fill valve actuator 167 transitioning from the open position to a closed position may stop the flow of liquid 142 into cistern 102. Liquid 144 may continue to flow out of leaky container 140 until leaky container is substantially void of liquid 142. The cistern 102 may comprise an amount of liquid less than the original flush ready quantity of liquid with the fill valve 170 in a closed position. In summary, these actions may shut-off the fill valve 170 to prevent a continuous leak of the cistern 102.

Figure 5:
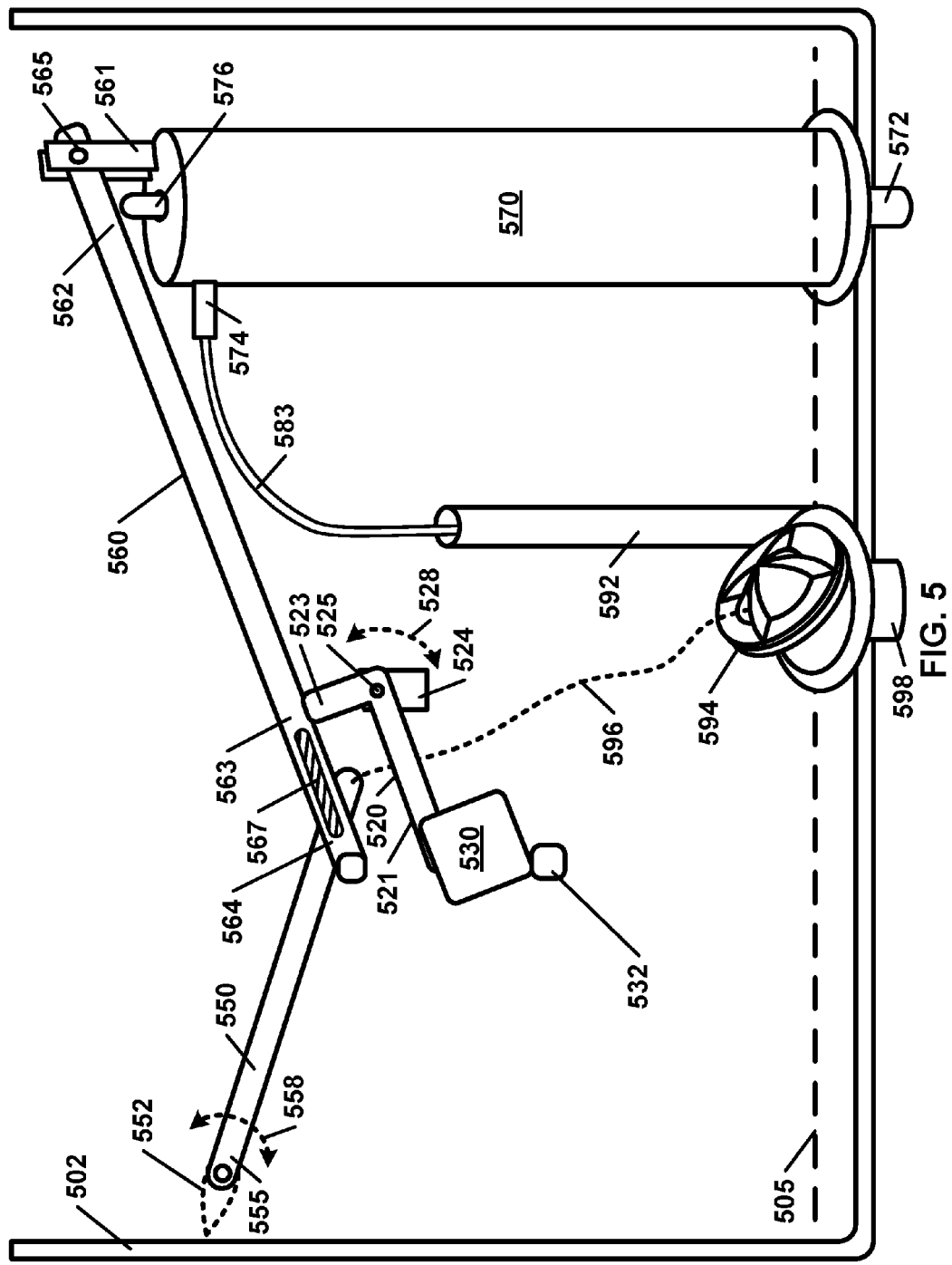
FIG. 5 is an example illustration of a front view of a fill valve switch in a flush tank as per an aspect of an embodiment of the present invention.
Figure 6A:
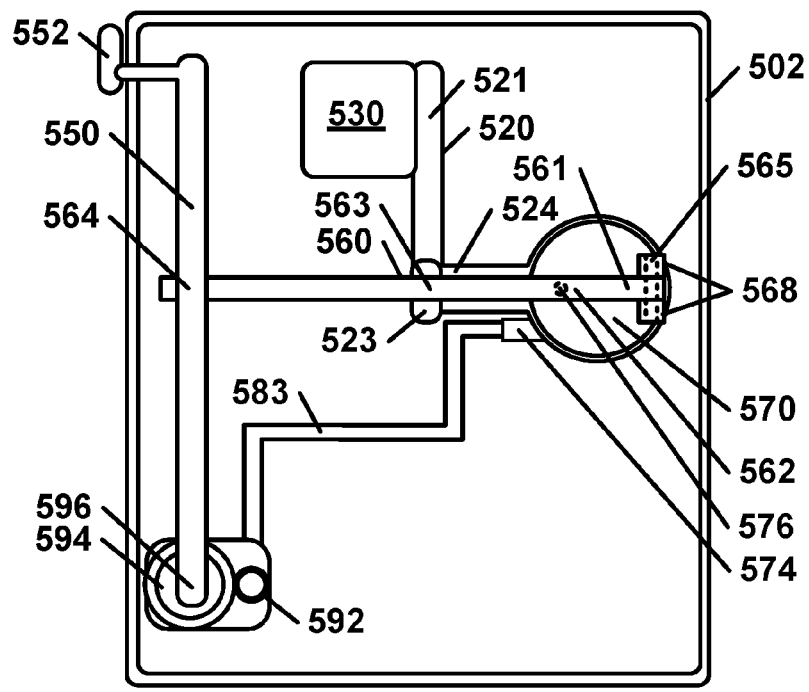
FIG. 6A is an example illustration of a top view of a fill valve switch in a flush tank as per an aspect of an embodiment of the present invention.
Figure 6B:
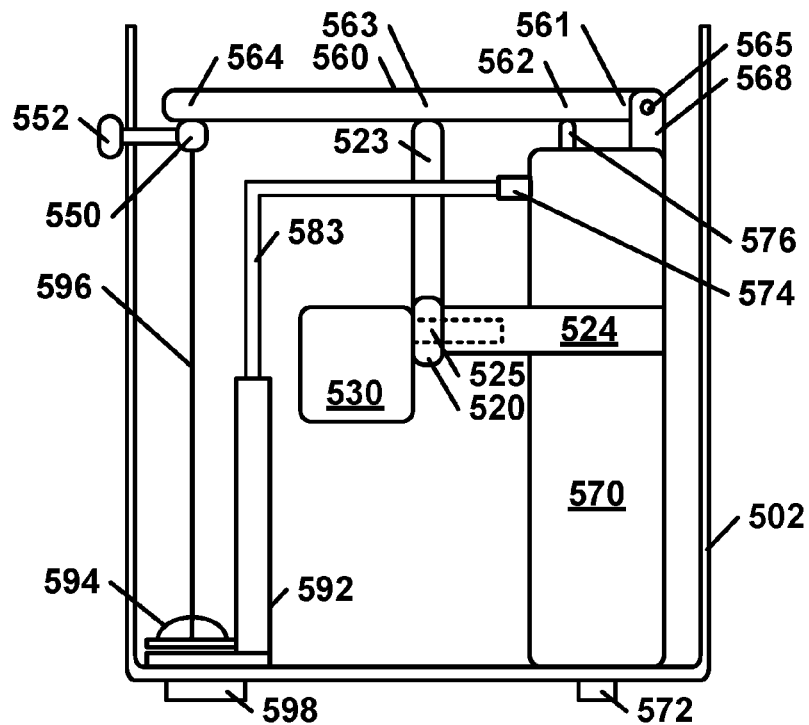
FIG. 6B is an example illustration of a side view of a fill valve switch in a flush tank as per an aspect of an embodiment of the present invention.

FIG. 5 is an example illustration of a front view of a fill valve switch apparatus in a flush tank 502 as per an aspect of an embodiment of the present invention. FIG. 6A is an example illustration of a top view of a fill valve switch in a flush tank 502 as per an aspect of an embodiment of the present invention. FIG. 6B is an example illustration of a side view of a fill valve switch in a flush tank as per an aspect of an embodiment of the present invention. The example apparatuses illustrated in FIG. 5, FIG. 6A, and FIG. 6B comprise a first support 561, a beam 520, a shelf 523, and an arm 560.

The first support 561 may be proximate to a fill valve 570. The fill valve 570 may comprise a fill valve activator 576. The fill valve actuator 576 may comprise an open position and a closed position. The open position may be configured to cause the fill valve 570 to pass liquid from an inlet 572 to an outlet 574. The closed position may be configured to prevent the fill valve 570 from passing liquid from the inlet 572 to the outlet 574. Outlet 574 may have a tube 583 configured to route excess liquid to overflow tube 592.

The beam 520 may be connected to a beam support 524 at a beam pivot point 525. The beam 520 may be configured to pivot (528) between a first beam position and a second beam position. The beam 520 may comprise a first beam portion 521 configured to be lifted by a float 530 on a first side of the beam pivot point 525 According to an embodiment, the beam support 524 may be positioned above a tank water line 505.

The shelf 523 may be offset from the length of the beam 520 and linked to the motion of the beam 520. The linkage may be direct. For example, as shown in FIG. 5, the shelf 523 is a perpendicular element rising from the length of the beam 520 and therefore may be configured to rotate with the movement of beam 523. However, alternative linkages may be employed. For example, a shelf may pivot about its own pivot point and be linked to beam 520 via, for example, a chain, a bar, combinations thereof, and/or the like. A shelf may be linked to beam 520 via sensor configured to monitor the movement of the beam 520 in combination with an actuator configured to move the shelf. According to various embodiments, actuators and sensors may be electrical and/or mechanical.

The arm 560 may be connected to the first support 561 at an arm pivot point 565. The arm 560 may extend from the arm pivot point 565 in the proximate direction of the beam 120 and shelf 523. The arm 560 may comprise a resting portion 563 configured to rest on at least the shelf 523. Depending upon the position of the arm 560 at any particular time, the resting portion 563 may sometimes rest on the beam 520 and may sometimes not rest on other elements.

The arm 560 may comprise a first arm lift portion 564 configured to be lifted by a lifting arm 550 from a first resting position to a second resting position on the shelf. The arm 560 may comprise an engagement portion 562 configured to place the fill valve actuator 576 in: the open position when the arm 560 is in the second resting position; and the closed position when the arm 560 is in the first resting position. The arm 560 may be configured to move from the second resting position to the first resting position when: the arm 560 is in the second resting position; and the beam 520 moves from the second beam position towards the first beam position.

According to an embodiment, the apparatus may further comprise a weight 567 attached to arm 560. The weight 567 may be configured to apply a gravitational downward force at the resting portion 563 of the arm 560. The weight 567 may be attached to arm 560. Weight 567 may be molded into arm 560. Weight 567 may be attached externally to arm 560. According to an embodiment, resting portion 563 may be heavier than the engagement portion 562. This may be achieved by varying material with different densities and/or volumes when constructing arm 560. This may also be achieved by varying the shape of arm 560. The effective weight of a portion of arm 560 may be adjusted by the distance that a weighted portion is positioned with respect to the arm pivot point 565.

According to an embodiment, engagement portion 562 may extend over the valve actuator 576. According to an embodiment, the engagement portion 562 may place the fill valve actuator 576 in the open position through positive contact pressure. According to an embodiment, the engagement portion 562 may place the fill valve actuator 576 in the closed position through a removal of positive contact pressure.

According to an embodiment, the apparatus may further comprise a beam motion limiter (i.e. 532). The beam motion limited may be configured/located to limit the pivoting motion (528) of beam 520. Beam motion limiter (i.e. 532) may be disposed to contact beam 520 at positions that may come into contact with a portion of beam 520 and/or other element connected to beam 520 (e.g. float 530). So for example, a beam motion limiter (i.e. 532) may be disposed in the path of float 540. Beam motion limiter (i.e. 532) may be disposed above and/or below beam 520. According to an embodiment, the apparatus may further comprise a beam motion limiter adjuster that may be configured to adjust the position of a beam motion limiter (i.e. 532) with respect to beam 520.

According to an embodiment, the apparatus may further comprise an arm motion limiter (i.e. 533). The beam motion limited may be configured/located to limit the pivoting motion of arm 560. Arm motion limiter (i.e. 533) may be disposed to contact arm 560 at positions that may come into contact with a portion of arm 560 and/or other element connected to arm 560 (e.g. weight 567). So for example, an arm motion limiter (i.e. 533) may be disposed in the path of weight 567. An arm motion limiter (i.e. 533) may be disposed above and/or below arm 560. According to an embodiment, the apparatus may further comprise an arm motion limiter adjuster that may be configured to adjust the position of the arm motion limiter (i.e. 533) with respect to arm 560.

According to an embodiment, the apparatus may further comprise a float height adjuster configured to adjust the height of a float (e.g. 540) relative to a portion of beam (e.g. 520) such as first bean portion (e.g. 521).

According to an embodiment, the apparatus may comprise a beam height adjuster configured to adjust the height of the beam pivot point 525 relative to the height of the arm pivot point 565. This adjustment may be employed to adjust the trip position of the arm 560 when resting on shelf 523 with respect to activating fill actuator 576.

According to an embodiment, the fill valve 570 may comprise a silent fill toilet cistern inlet valve. A silent fill toilet cistern inlet valve is a type of inlet valve referred to as silent because it is configured to fill a cistern quickly (approximately 30 seconds to one minute) and without significant sounds of rushing and splashing water within the cistern. The silence may be mainly achieved by keeping the outlet of the inlet valve below the water level in the cistern. Silent fill toilet cistern inlet valve(s) may be obtained from Fluid Master, Inc. of San Juan Capistrano Calif. and Lavelle Industries Inc. of Burlington, Wis.

As illustrated in FIG. 5 and according to an embodiment, the first support 561 may be adjacent to fill valve activator 576. The first support 561 may be disposed on the fill valve 570. According to an embodiment, the first support first support (e.g 570) may be attached to a fill valve (e.g. 570) cap. According to an embodiment, the first support may be attached to a strap configured to circumnavigate a vertical portion of the fill valve.

According to an embodiment, the lifting arm 550 may extend from a flush handle 552 towards the arm lift portion 564. The lifting arm 550 may pivot (e.g. 558) about a flushing pivot point 555 in accord with the movement of the flush handle 552. According to an embodiment, the lifting arm 550 may be lifted by a mechanical linkage to an activation mechanism. Examples of activation mechanism(s) comprise a switch, a button, a second handle, a multidirectional handle (i.e. up for a short flush, down for a long flush), a solenoid, a motor, a spring mechanism, combinations thereof, and/or the like. The lifting arm 550 may be connected to flapper 594 via a chain 596, and/or other linkage (e.g. connecting rod). When the lifting arm 558 is rotated (558) upward against arm 560, the linkage 596 may activate the drainage of the cistern by, for example, opening flapper 594 and/or other valve mechanism, so that liquid in the cistern may evacuate the cistern via drain 598.

A cistern may develop a crack and/or other source of leakage (e.g. via flapper 594) causing a leak of liquid from the cistern. This leak may prevent the water level 505 from rising, potentially causing a long term leak. However, as illustrated, arm 560 may hold the fill valve actuator 576 in a closed position preventing fill valve 570 from continuously trying to fill the cistern. The operation of this leak abatement embodiment will now be described with the aid of FIG. 7A, FIG. 7B, and FIG. 7C. In other words, if the cistern 502 develops a leak between flushing cycles, the example embodiment illustrated in FIGS. 7A, 7B and 7C may limit the leakage to the amount of liquid in a cistern before the leak occurs. Additionally, this embodiment may not require a diverter and/or chain.

Figure 7A:
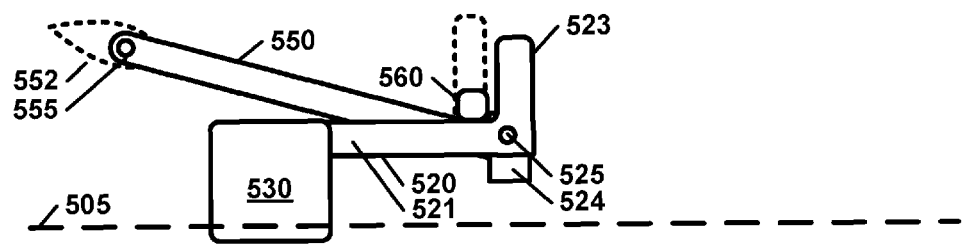
FIG. 7A is an example illustration of a front view of a fill valve switch trigger mechanism in a nominal position as per an aspect of an embodiment of the present invention.
Figure 7B:
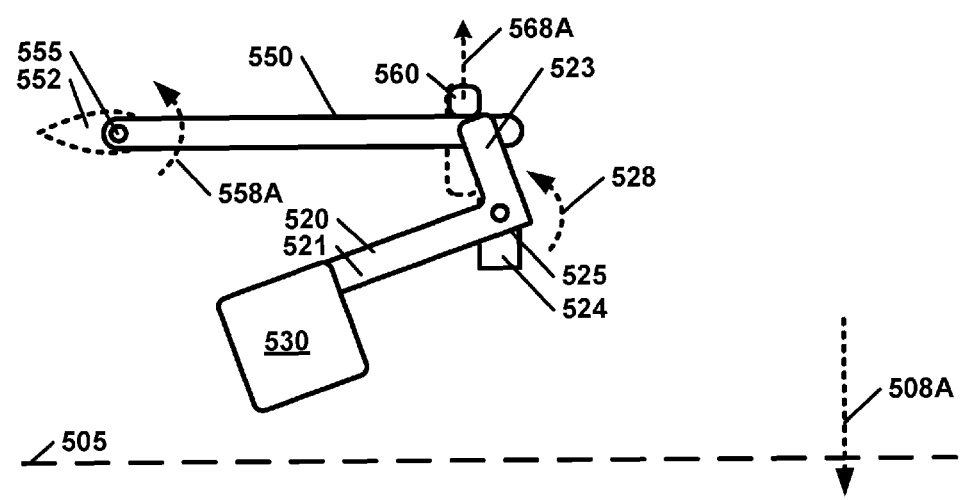
FIG. 7B is an example illustration of a front view of a fill valve switch trigger mechanism in a flushing position as per an aspect of an embodiment of the present invention.
Figure 7C:
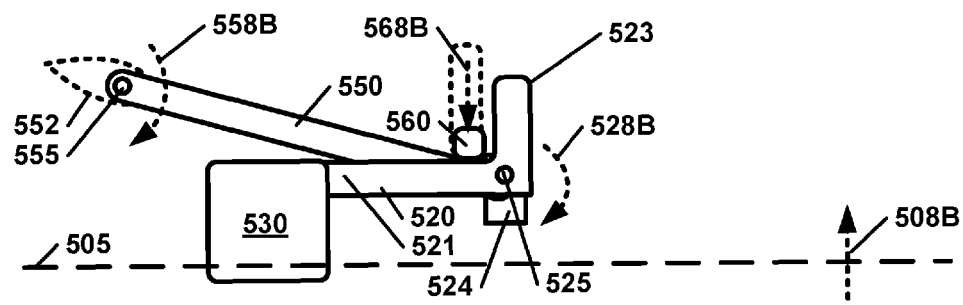
FIG. 7C is an example illustration of a front view of a fill valve switch trigger mechanism in a recently filled position as per an aspect of an embodiment of the present invention.

FIG. 7A is an example illustration of a front view of a fill valve switch trigger mechanism in a nominal position, FIG. 7B is an example illustration of a front view of a fill valve switch trigger mechanism in a flushing position, and FIG. 7C is an example illustration of a front view of a fill valve switch trigger mechanism in a recently filled position. As shown in FIG. 7A, cistern 502 is in a nominal filled flush ready position. Float 530, resting on water level 505, may hold beam 520 in a first position. Arm 560 may be in a first resting position, which in this example, has arm 560 resting on beam 520. In this position, arm 560 may hold fill valve actuator 576 in a closed position, preventing fill valve 570 from delivering additional water into cistern 502.

As illustrated in FIG. 7B, flush handle 552 has been pivoted about flush handle pivot point 555 to cause lifting arm 550 to rotate (458A). Rotation (458A) may cause lift arm 550 to lift (568A) arm 560 out of the way of shelf 523. Water level 505 dropping (508A) may cause beam 523 to rotate (428A) about beam pivot point 525 to place shelf 523 below arm 560. Releasing flush handle 552 may cause arm 560 to settle in a second rest position on shelf 523. Arm 560 in the second rest position may hold the fill valve actuator 576 in an open position allowing liquid to fill cistern 502.

As illustrated in FIG. 7C, the fill valve 570 may attempt to fill the cistern. When the cistern 502 is not leaking, the water level 505 may rise (508B). The water level 505 rising (508B) may cause float 530 to rise up. Float 530 rising may cause beam 520 to rotate (528B). Rotation (528B) may cause shelf 523 to move. Shelf 523 moving may cause arm 560 to move (568B) from the second resting position back to the first resting position. Arm 560 moving from the second resting position back to the first resting position may cause the fill valve actuator 567 to transition from an open position to a closed position. Fill valve actuator 567 transitioning from an open position to a closed position may stop the flow of liquid 542 into cistern 502. Cistern 502 may now be back into the nominal position illustrated in FIG. 7A.

Figure 8A:
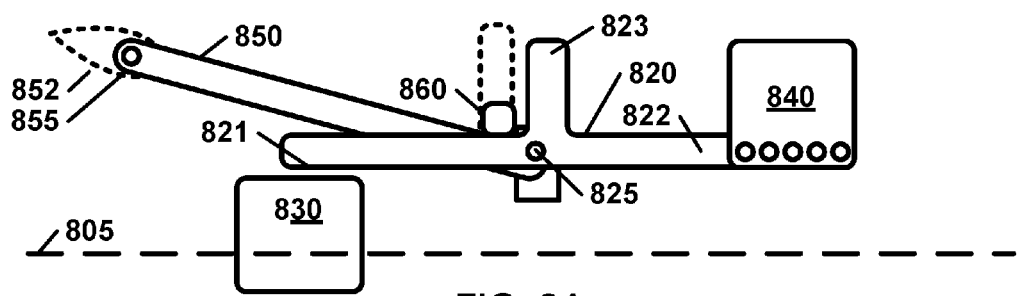
FIG. 8A is an example illustration of a front view of a fill valve switch trigger mechanism employing a moving float in a nominal position as per an aspect of an embodiment of the present invention.
Figure 8B:
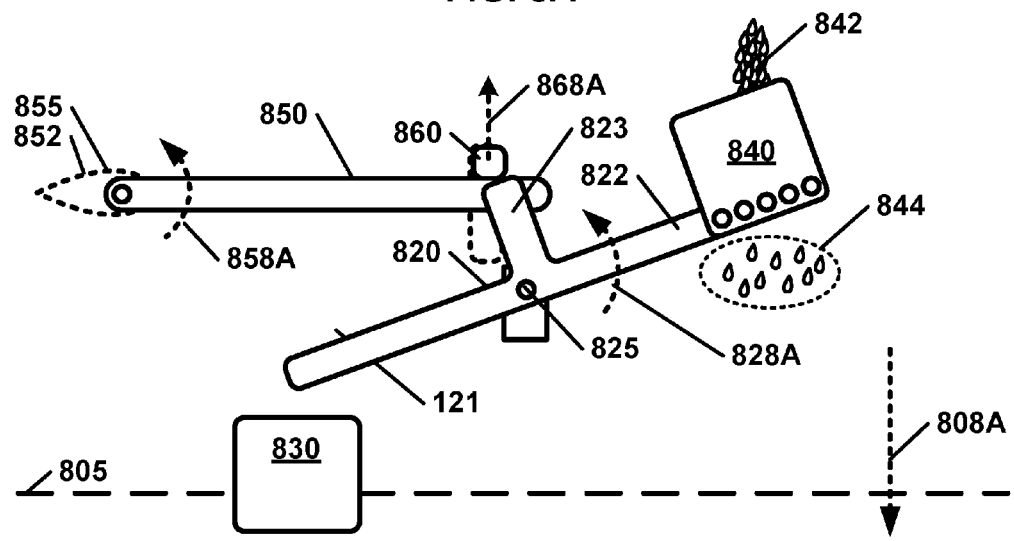
FIG. 8B is an example illustration of a front view of a fill valve switch trigger mechanism employing a moving float in a flushing position as per an aspect of an embodiment of the present invention.
Figure 8C:
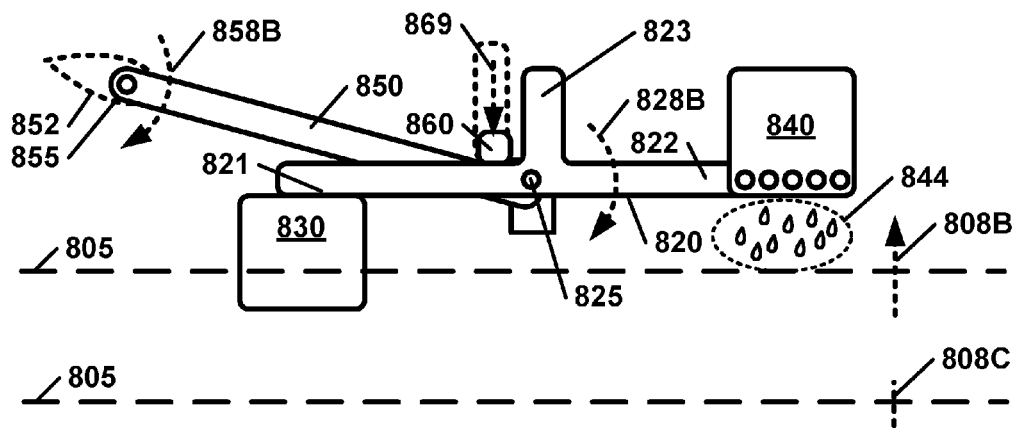
FIG. 8C is an example illustration of a front view of a fill valve switch trigger mechanism employing a moving float in a recently filled position as per an aspect of an embodiment of the present invention.

FIG. 8A is an example illustration of a front view of a fill valve switch trigger mechanism employing a moving float 830 in a nominal position, FIG. 8B is an example illustration of a front view of a fill valve switch trigger mechanism employing a moving float 830 in a flushing position, and FIG. 8C is an example illustration of a front view of a fill valve switch trigger mechanism employing a moving float 830 in a recently filled position. As illustrated in example FIG. 8A, FIG. 8B, and FIG. 8C, a float 830 may be configured to be movable into a path with a contact portion 821 of beam 820. In other words, float 830 may be configured so that it may contact (directly and/or indirectly) a contact portion 821 of beam 820 when the liquid level 805 raises float 830. The contact of float 830 with the contact portion 821 of beam 820 may cause the beam 820 to rotate about beam pivot point 825. The contact portion 821 of the beam 820 may comprise, according to alternative embodiments, other portion(s) of beam 820.

As illustrated in FIG. 8A, a cistern is in a nominal filled flush ready position. Float 830, resting on water level 805, may hold beam 820 in a first position though contact with a contact portion 821 of beam 820. Arm 860 may be in a first resting position, which in this example, has arm 860 resting on beam 820. In this position, arm 860 may hold a fill valve actuator in a closed position, preventing a fill valve from delivering additional water into the cistern.

As illustrated in FIG. 8B, flush handle 852 has been pivoted about flush handle pivot point 855 to cause lifting arm 850 to rotate (458A). Rotation (458A) may cause lift arm 850 to lift (868A) arm 860 out of the way of shelf 823. Beam 820 may need to be configured so that the balance of beam 820 is heavier on the contact portion 821 side of beam 820 is heavier than the opposite beam portion 822. Water level 805 dropping (808A) may cause float 830 to drop. Float 830 dropping may cause beam 823 to rotate (428A) about beam pivot point 825 to place shelf 823 below arm 860. Releasing flush handle 852 may cause arm 860 to settle in a second rest position on shelf 823. Arm 860 in the second rest position may hold the fill valve actuator in an open position allowing liquid to fill the cistern.

As illustrated in FIG. 8C, the fill valve may attempt to fill the cistern. When the cistern is not leaking, the water level 805 may rise (808B). The water level 805 rising (808B) may cause float 830 to rise up. Float 830 rising may cause beam 820 to rotate (828B) when float 830 contacts the contact portion 821 of beam 820. Rotation (828B) may cause shelf 823 to move. Shelf 823 moving may cause arm 860 to move (868B) from the second resting position to the first resting position. Arm 860 moving from the second resting position to the first resting position may cause the fill valve actuator to transition from an open position to a closed position. The fill valve actuator transitioning from an open position to a closed position may stop the flow of liquid into the cistern. The Cistern may be back in a nominal filled flush ready position.

As illustrated in FIG. 8C, the fill valve may attempt to fill the cistern. When the cistern is leaking, the water level 805 may not rise (808C) as described previously. In this case, float 830 may not rise. However, while the fill valve is in an open position, liquid 842 may flow from a diverter into leaky container 840 at a rate that is greater than liquid 844 flowing out of leaky container 840. The differential flow of liquid in (842) and out (844) of leaky container 840 may cause leaky container 840 to gain weight. Leaky container 840 gaining weight may cause beam 820 to rotate (828B). Rotation (828B) may cause shelf 823 to move. Shelf 823 moving may cause arm 860 to move from the second resting position back to the first resting position. Arm 860 moving from the second resting position back to the first resting position may cause the fill valve actuator to transition from the open position to a closed position. The fill valve actuator transitioning from the open position to a closed position may stop the flow of liquid 842 from the diverter into leaky container 840. The fill valve actuator transitioning from the open position to a closed position may stop the flow of liquid into the cistern. Liquid 844 may continue to flow out of leaky container 840 until leaky container 840 is substantially void of liquid 842. The cistern may comprise an amount of liquid less than the original flush ready quantity of liquid with the fill valve in a closed position. In summary, these actions may shut-off the fill valve to prevent a continuous leak of the cistern.

Figure 9A:
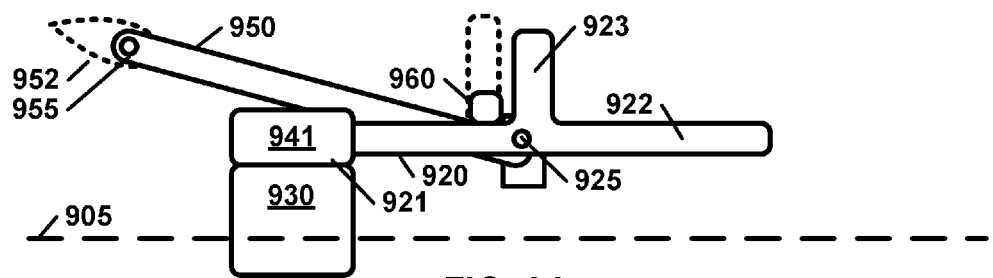
FIG. 9A is an example illustration of a front view of a fill valve switch trigger mechanism employing a moving float and a counter balance in a nominal position as per an aspect of an embodiment of the present invention.
Figure 9B:
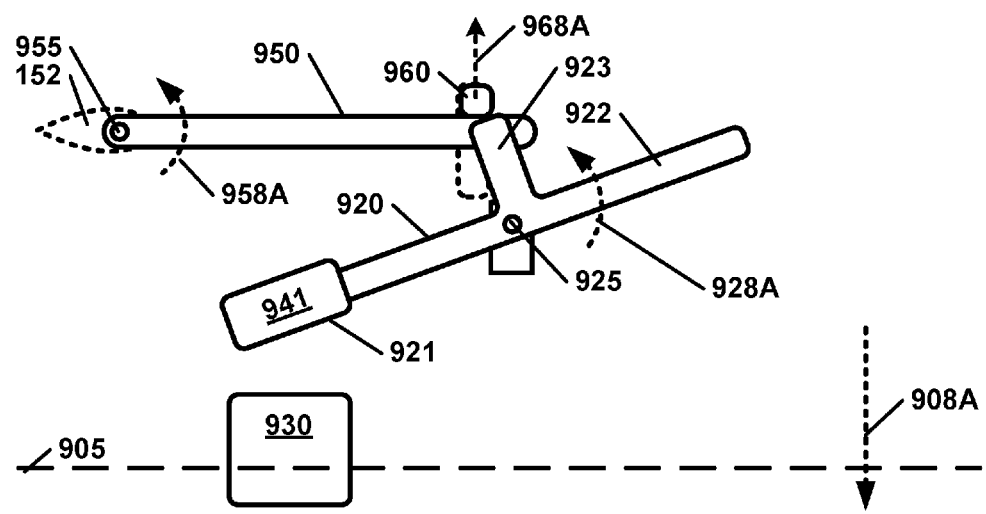
FIG. 9B is an example illustration of a front view of a fill valve switch trigger mechanism employing a moving float and a counter balance in a flushing position as per an aspect of an embodiment of the present invention.
Figure 9C:
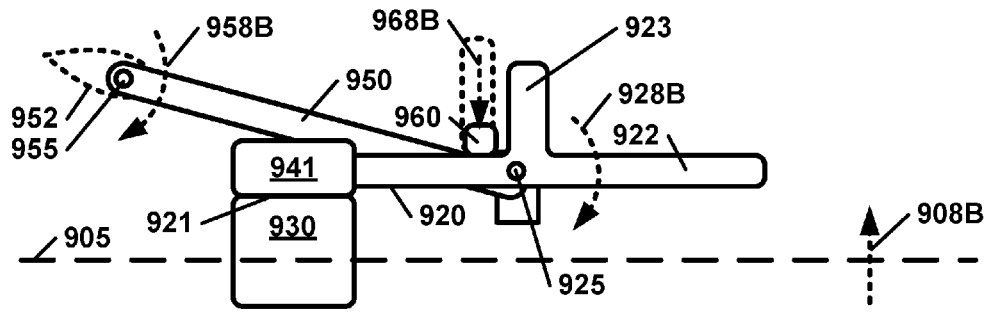
FIG. 9C is an example illustration of a front view of a fill valve switch trigger mechanism employing a moving float and a counter balance in a recently filled position as per an aspect of an embodiment of the present invention.

FIG. 9A is an example illustration of a front view of a fill valve switch trigger mechanism employing a moving float 930 and a weight 941 in a nominal position, FIG. 9B is an example illustration of a front view of a fill valve switch trigger mechanism employing a moving float 930 and a weight 941 in a flushing position, and FIG. 9C is an example illustration of a front view of a fill valve switch trigger mechanism employing a moving float 930 and a weight 941 in a recently filled position. As illustrated in example FIG. 9A, FIG. 9B, and FIG. 9C, a float 930 may be configured to be movable into a path with a contact portion 921 of beam 920. A weight 941 may be disposed on the contact portion 921 side of beam 920. In other words, float 930 may be configured so that it may contact (directly and/or indirectly) a contact portion 921 of beam 920 when the liquid level 905 raises float 930. The contact of float 930 with the contact portion 921 of beam 920 may counteract the effect of weight 941 to cause the beam 920 to rotate about beam pivot point 925. The contact portion 921 of the beam 920 may comprise, according to alternative embodiments, other portion(s) of beam 920.

As illustrated in FIG. 9A, a cistern is in a nominal filled flush ready position. Float 930, resting on water level 905, may hold beam 920 in a first position though contact with a contact portion 921 of beam 920. The contact portion 921 of beam 920 may comprise a portion of weight 941. Arm 960 may be in a first resting position, which in this example, has arm 960 resting on beam 920. In this position, arm 960 may hold a fill valve actuator in a closed position, preventing a fill valve from delivering additional water into the cistern.

As illustrated in FIG. 9B, flush handle 952 has been pivoted about flush handle pivot point 955 to cause lifting arm 950 to rotate (958A). Rotation (958A) may cause lift arm 950 to lift (968A) arm 960 out of the way of shelf 923. Beam 920 may be configured so that the balance of beam 920 is heavier on the contact portion 921 side of beam 920 than the opposite beam portion 922. This configuration may comprise the placement of weight 941. Water level 905 dropping (908A) may cause float 930 to drop. Float 930 dropping may cause beam 923 to rotate (928A) about beam pivot point 925 to place shelf 923 below arm 960. Releasing flush handle 952 may cause arm 960 to settle in a second rest position on shelf 923. Arm 960 in the second rest position may hold the fill valve actuator in an open position allowing liquid to fill the cistern.

As illustrated in FIG. 9C, the fill valve may attempt to fill the cistern. When the cistern is not leaking, the water level 905 may rise (908B). The water level 905 rising (908B) may cause float 930 to rise up. Float 930 rising may cause beam 920 to rotate (928B) when float 930 contacts the contact portion 921 of beam 920. Rotation (928B) may cause shelf 923 to move. Shelf 923 moving may cause arm 960 to move (968B) from the second resting position to the first resting position. Arm 960 moving from the second resting position to the first resting position may cause the fill valve actuator to transition from an open position to a closed position. The fill valve actuator transitioning from an open position to a closed position may stop the flow of liquid into the cistern. The Cistern may be back in a nominal filled flush ready position.

Figure 10A:
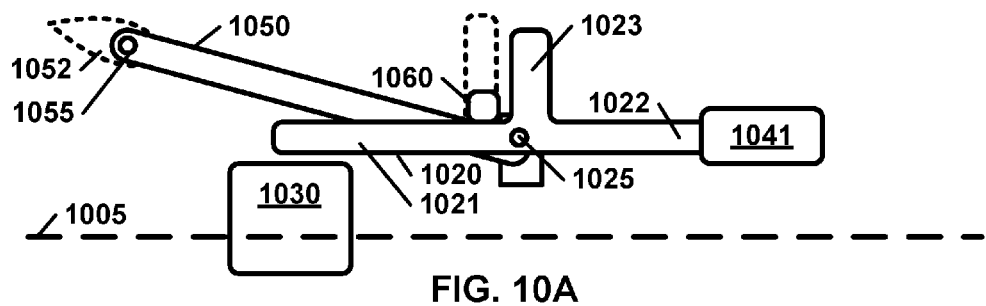
FIG. 10A is an example illustration of a front view of a fill valve switch trigger mechanism employing a moving float and a counter balance in a nominal position as per an aspect of an embodiment of the present invention.
Figure 10B:
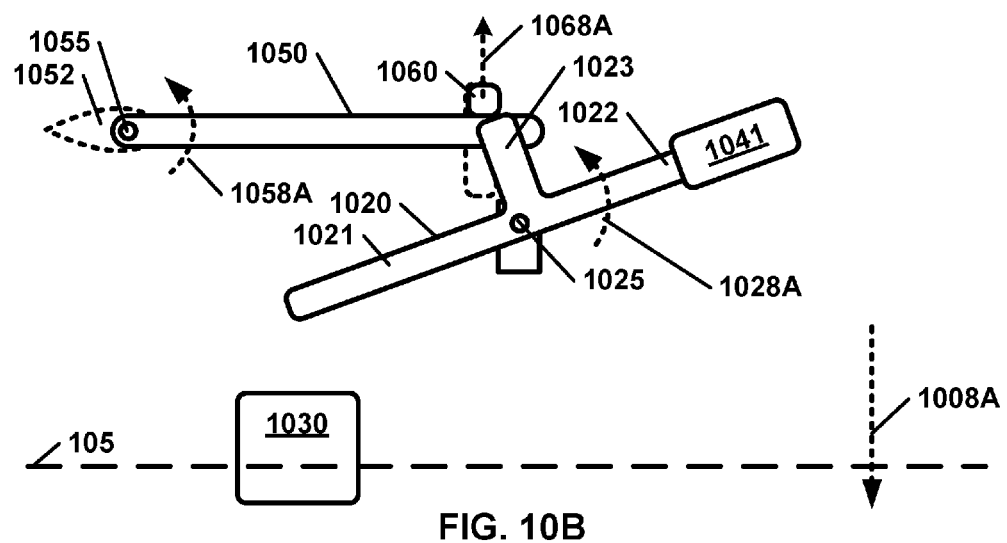
FIG. 10B is an example illustration of a front view of a fill valve switch trigger mechanism employing a moving float and a counter balance in a flushing position as per an aspect of an embodiment of the present invention.
Figure 10C:
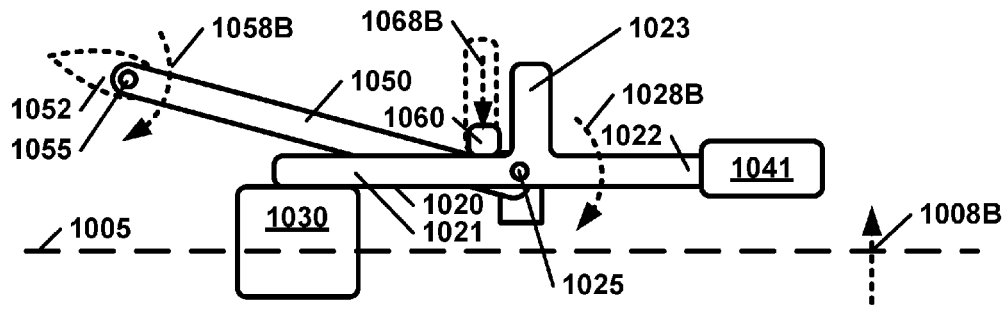
FIG. 10C is an example illustration of a front view of a fill valve switch trigger mechanism employing a moving float and a counter balance in a recently filled position as per an aspect of an embodiment of the present invention.

FIG. 10A is an example illustration of a front view of a fill valve switch trigger mechanism employing a moving float and a counter balance in a nominal position. FIG. 10B is an example illustration of a front view of a fill valve switch trigger mechanism employing a moving float and a counter balance in a flushing position. FIG. 10C is an example illustration of a front view of a fill valve switch trigger mechanism employing a moving float and a counter balance in a recently filled position. As illustrated in example FIG. 10A, FIG. 10B, and FIG. 10C, a float 1030 may be configured to be movable into a path with a contact portion 1021 of beam 1020. A counter-balance 1041 may be disposed on portion 1022 side of beam 1020. Float 1030 may be configured so that it may contact (directly and/or indirectly) a contact portion 1021 of beam 1020 when the liquid level 1005 raises float 1030. The counter-balance 1041 may be disposed on portion 1022 of beam 1020 to counteract the weight of beam portion 1021 on the opposite side of beam pivot point 1025 to cause beam 1020 to have a default position (e.g. not affected by float 1030 and/or arm 1060) with beam portion 1021 lower than beam portion 1022.

As illustrated in FIG. 10A, a cistern is in a nominal filled flush ready position. Float 1030, resting on water level 1005, may hold beam 1020 in a first position though contact with a contact portion 1021 of beam 1020. Arm 1060 may be in a first resting position, which in this example, has arm 1060 resting on beam 1020. In this position, arm 1060 may hold a fill valve actuator in a closed position, preventing a fill valve from delivering additional water into the cistern.

As illustrated in FIG. 10B, flush handle 1052 has been pivoted about flush handle pivot point 1055 to cause lifting arm 1050 to rotate (1058A). Rotation (1058A) may cause lift arm 1050 to lift (1068A) arm 1060 out of the way of shelf 1023. Beam 1020 may be configured so that the balance of beam 1020 is heavier on the contact portion 1021 side of beam 1020 than the opposite beam portion 1022. This configuration may comprise the placement of counter-balance 1041. Water level 1005 dropping (1008A) may cause float 1030 to drop. Float 1030 dropping may cause beam 1023 to rotate (1028A) about beam pivot point 1025 to place shelf 1023 below arm 1060. Releasing flush handle 1052 may cause arm 1060 to settle in a second rest position on shelf 1023. Arm 1060 in the second rest position may hold the fill valve actuator in an open position allowing liquid to fill the cistern.

As illustrated in FIG. 10C, the fill valve may attempt to fill the cistern. When the cistern is not leaking, the water level 1005 may rise (1008B). The water level 1005 rising (1008B) may cause float 1030 to rise up. Float 1030 rising may cause beam 1020 to rotate (1028B) when float 1030 contacts the contact portion 1021 of beam 1020. Rotation (1028B) may cause shelf 1023 to move. Shelf 1023 moving may cause arm 1060 to move (1068B) from the second resting position to the first resting position. Arm 1060 moving from the second resting position to the first resting position may cause the fill valve actuator to transition from an open position to a closed position. The fill valve actuator transitioning from an open position to a closed position may stop the flow of liquid into the cistern. The Cistern may be back in a nominal filled flush ready position.

Figure 11A:
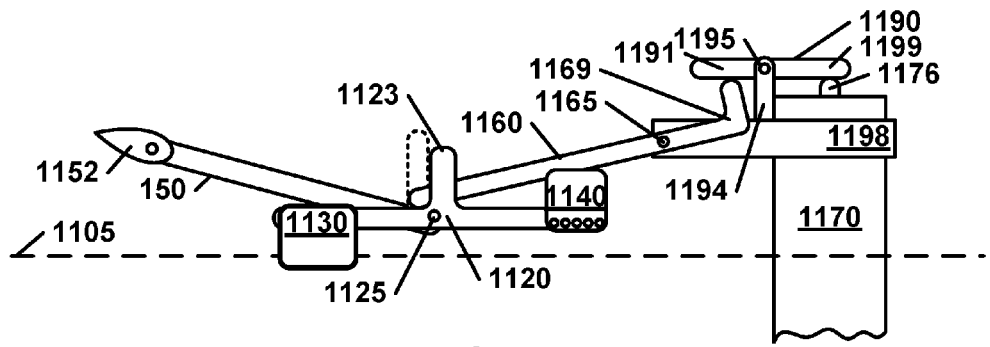
FIG. 11A is an example illustration of a front view of a fill valve switch trigger and locking mechanism in a nominal position as per an aspect of an embodiment of the present invention.
Figure 11B:
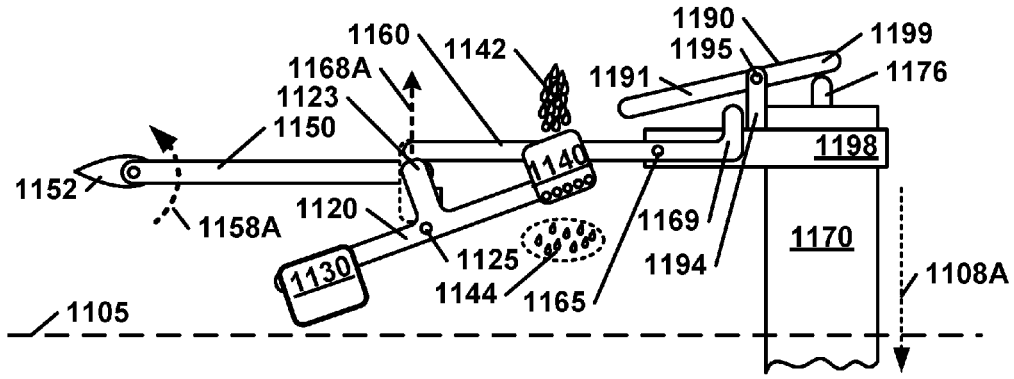
FIG. 11B is an example illustration of a front view of a fill valve switch trigger and locking mechanism in a flushing position as per an aspect of an embodiment of the present invention.
Figure 11C:
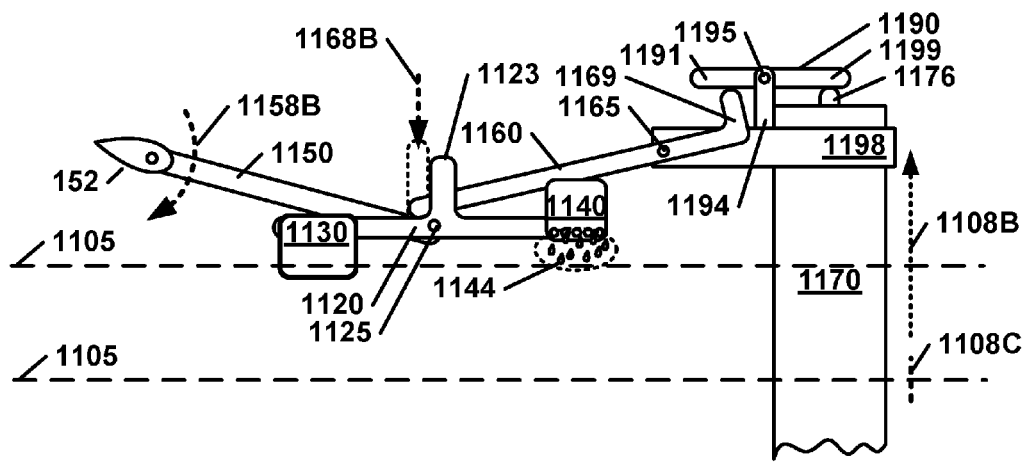
FIG. 11C is an example illustration of a front view of a fill valve switch trigger and locking mechanism in a recently filled position as per an aspect of an embodiment of the present invention.

FIG. 11A is an example illustration of a front view of a fill valve switch trigger and locking mechanism in a nominal position. FIG. 11B is an example illustration of a front view of a fill valve switch trigger and locking mechanism in a flushing position. FIG. 11C is an example illustration of a front view of a fill valve switch trigger and locking mechanism in a recently filled position. According to an embodiment, the apparatus may further comprise an engagement mechanism controlled by an engagement portion 1169. The engagement mechanism may comprise an engagement support 1194 and an engagement lever 1190. The engagement support 1194 may be offset from the fill valve actuator 1176. The engagement lever 1190 may be connected to the engagement support 1194 at an engagement pivot point 1195. The engagement lever 1190 may comprise a pressing portion 1199 and a locking portion 1191. The pressing portion 1199 may be disposed on the fill valve actuator 1176 side of the engagement pivot point 1195. The locking portion 1191 may be configured to limit the pressing portion 1199 from applying a sufficient amount of force to change the position of the fill valve actuator 1176 through contact with the engagement portion 1169.

According to an embodiment, the locking portion 1191 may be configured to contact the engagement portion 1169 from below. Embodiments may be configured such that the locking portion 1191 may be configured to contact the engagement portion 1169 from above. Embodiments may be configured such that the locking portion 1191 may be configured to contact the engagement portion 1169 through an intermediary linkage.

As shown in FIG. 11A, a cistern is in a nominal filled flush ready position. Float 1130, resting on water level 1105, may hold beam 1120 in a first position. Arm 1160 may be in a first resting position, which in this example, has arm 1160 resting on beam 1120. In this position, locking portion 1169 of arm 1160 may lock fill valve actuator 1176 in a closed position, preventing fill valve 1170 from delivering additional water into the cistern.

As illustrated in FIG. 11B, flush handle 1152 has been pivoted about flush handle pivot point 1155 to cause lifting arm 1150 to rotate (1158A). Rotation (1158A) may cause lift arm 1150 to lift (1168A) arm 1160 out of the way of shelf 1123. Water level 1105 dropping (1108A) may cause beam 1123 to rotate (1128A) about beam pivot point 1125 to place shelf 1123 below arm 1160. Releasing flush handle 1152 may cause arm 1160 to settle in a second rest position on shelf 1123. Arm 1160 in the second rest position may unlock fill valve actuator 1176. Unlocking fill valve actuator 1176 may cause fill valve actuator 1176 to transition) to an open position allowing liquid to fill the cistern.

As illustrated in FIG. 11C, the fill valve 1170 may attempt to fill the cistern. When the cistern is not leaking, the water level 1105 may rise (1108B). The water level 1105 rising (1108B) may cause float 130 to rise up. Float 130 rising may cause beam 1120 to rotate (1128B). Rotation (1128B) may cause shelf 1123 to move. Shelf 1123 moving may cause arm 1160 to move (1168B) from the second resting position back to the first resting position. Arm 1160 moving from the second resting position to the first resting position may cause the locking portion 1169 of arm 1160 to transition into and lock fill valve actuator 1167 in a closed position. Fill valve actuator 1167 transitioning from an open position to a closed position may stop the flow of liquid 1142 into the cistern. The cistern may now be back into the nominal position illustrated in FIG. 11A.

As illustrated in FIG. 11C, the fill valve 1170 may attempt to fill cistern 1102. When cistern 1102 is leaking, the water level 1105 may not rise (1108C) as described previously. In this case, float 1130 may not rise. However, while the fill valve 1170 is in an open position, liquid 1142 may flow from diverter 1180 into leaky container 1140 at a rate that is greater than liquid 1144 flowing out of leaky container 1140. The differential flow of liquid in (1142) and liquid out (1144) of leaky container 1140 may cause leaky container 1140 to gain weight. Leaky container 1140 gaining weight may cause beam 1120 to rotate (1128B). Rotation (1128B) may cause shelf 1123 to move. Shelf 1123 moving may cause arm 1160 to move from the second resting position back to the first resting position. Arm 1160 moving from the second resting position back to the first resting position may cause the fill valve actuator 1167 to transition from the open position to a closed position via engagement lever 1190. Fill valve actuator 1167 transitioning from the open position to a closed position may stop the flow of liquid 1142 from diverter 1180 into leaky container 1140. Fill valve actuator 1167 transitioning from the open position to a closed position may stop the flow of liquid 1142 into the cistern. Liquid 1144 may continue to flow out of leaky container 1140 until leaky container is substantially void of liquid 1142. The cistern may comprise an amount of liquid less than the original flush ready quantity of liquid with the fill valve 1170 in a closed position. In summary, these actions may lock fill valve 1170 in a closed position to prevent a continuous leak of the cistern 102.

According to an embodiment, the engagement support 1194 may be disposed on a to a strap 1198 configured to circumnavigate a vertical portion of the fill valve 1170. According to an embodiment, arm 1160 may be connected to engagement support 1194 at arm pivot point 1165. According to an embodiment, the engagement support 1194 may be disposed on a cap configured to be disposed on fill valve 1170. According to an embodiment, arm 1160 may be connected to engagement support 1194 disposed on a cap configured to be disposed on fill valve 1170 at arm pivot point 1165. A cap embodiment may be configured to adapt, reconfigure, and/or convert a fill valve (e.g. 1170) act as: for example, arm (e.g. 1160) support, beam support (e.g. 124), engagement support 1194, combinations thereof, and/or the like.

Figure 12A:
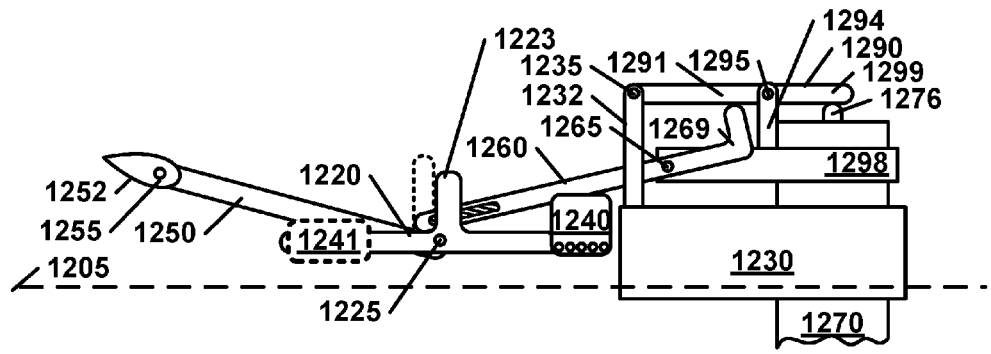
FIG. 12A is an example illustration of a front view of a fill valve switch trigger and locking mechanism employing a fill valve moving float in a nominal position as per an aspect of an embodiment of the present invention.
Figure 12B:
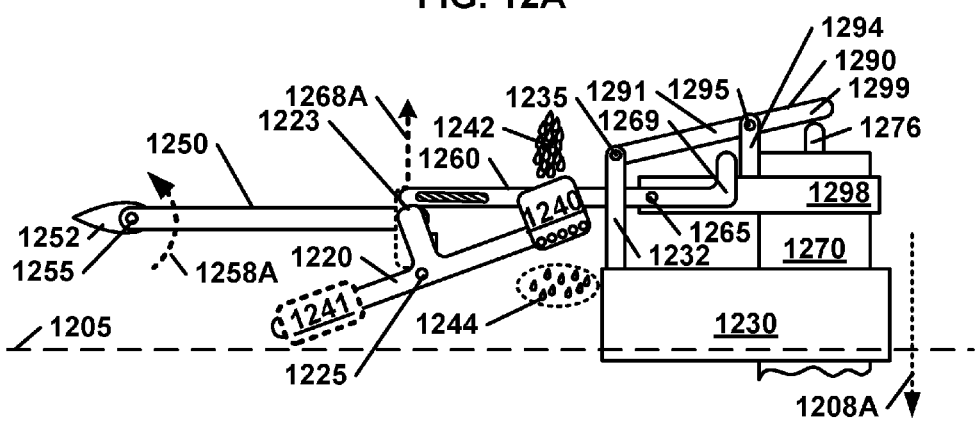
FIG. 12B is an example illustration of a front view of a fill valve switch trigger and locking mechanism employing a fill valve moving float in a flushing position as per an aspect of an embodiment of the present invention.
Figure 12C:
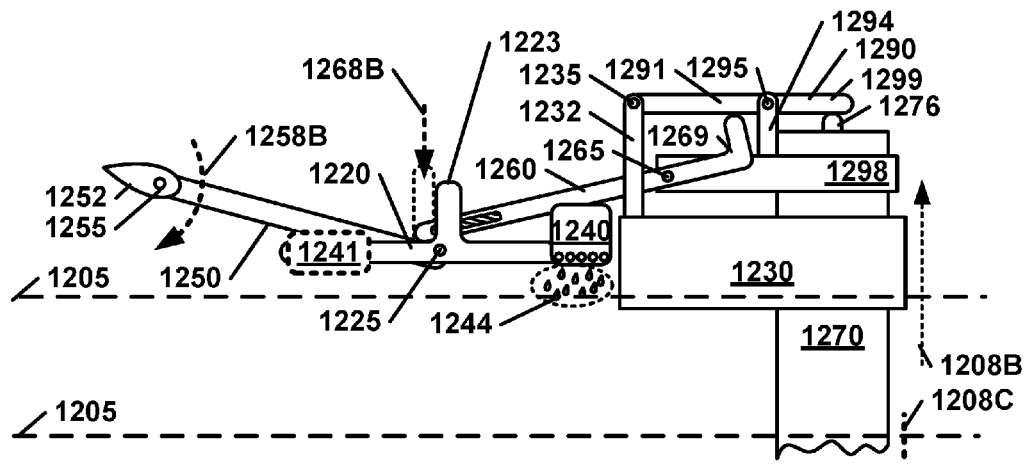
FIG. 12C is an example illustration of a front view of a fill valve switch trigger and locking mechanism employing a fill valve moving float in a recently filled position as per an aspect of an embodiment of the present invention.

FIG. 12A is an example illustration of a front view of a fill valve switch trigger and locking mechanism employing a fill valve 1270 moving float 1230 in a nominal position. FIG. 12B is an example illustration of a front view of a fill valve switch trigger and locking mechanism employing a fill valve 1270 moving float 1230 in a flushing position. FIG. 12C is an example illustration of a front view of a fill valve switch trigger and locking mechanism employing a fill valve 1270 moving float 1230 in a recently filled position. As illustrated in example FIGS. 12A, 12B, 12C, float 1230 may be movably connected to fill valve 1270.

According to an embodiment, the apparatus may comprise an engagement mechanism controlled by an engagement portion 1269 of arm 1260. The engagement mechanism may comprise an engagement support 1294 and an engagement lever 1290. The engagement support 1294 may be offset from the fill valve actuator 1276. The engagement support 1294 may be connected to a strap 1298 configured to circumnavigate a vertical portion of the fill valve 1270. The engagement lever 1290 may be connected to the engagement support 1294 at an engagement pivot point 1295. The engagement lever 1290 may comprise a pressing portion 1299 and a locking portion 1291. The pressing portion 1299 may be disposed on the fill valve actuator 1276 side of the engagement pivot point 1295. The locking portion 1291 may be configured to limit the pressing portion 1299 from applying a sufficient amount of force to change the position of the fill valve actuator 1276 through contact with the engagement portion 1269. The engagement lever 1290 may be connected to float 1230 via a linkage 1232. Linkage 1232 may connect to engagement lever 1290 at a linkage lever pivot point 1235.

According to an embodiment, the locking portion 1291 may be configured to contact the engagement portion 1269 from below. Embodiments may be configured such that the locking portion 1291 may be configured to contact the engagement portion 1269 from above. Embodiments may be configured such that the locking portion 1291 may be configured to contact the engagement portion 1269 through an intermediary linkage.

As shown in FIG. 12A, a cistern is in a nominal filled flush ready position. Float 1230, resting on water level 1205, may cause engagement lever 1290 to pivot about linkage lever pivot point 1235. Engagement lever 1290 pivoting about linkage lever pivot point 1235 may cause pressing portion 1299 to apply pressure to fill valve actuator 1276. Pressure applied to fill valve actuator 1276 may hold fill valve 1270 in a closed position, preventing fill valve 1270 from delivering additional water into the cistern.

Beam 1220 may be in a first position. The first position may be the result of a balance between the weight of leaky container 1240, the weight of optional weight 1241, the density distribution across beam 1220, and the distance of weight 1241 and leaky container 1240 from the beam pivot point 1225. Arm 1260 may be in a first resting position, which in this example, has arm 1260 resting on beam 1220. In this position, locking portion 1269 of arm 1260 may lock fill valve actuator 1276 in a closed position by preventing engagement lever 1290 from pivoting about linkage lever pivot point 1235 to apply pressure to fill valve actuator 1276. This locking position may prevent fill valve 1270 from delivering additional water into the cistern.

As illustrated in FIG. 12B, flush handle 1252 has been pivoted about flush handle pivot point 1255 to cause lifting arm 1250 to rotate (1258A). Rotation (1258A) may cause lift arm 1250 to lift (1268A) arm 1260 out of the way of shelf 1223. Water level 1205 dropping (1208A) may cause beam 1223 to rotate (1228A) about beam pivot point 1225 to place shelf 1223 below arm 1260. Releasing flush handle 1252 may cause arm 1260 to settle in a second rest position on shelf 1223. Arm 1260 in the second rest position may unlock fill valve actuator 1276 by allowing engagement lever 1290 to pivot about linkage lever pivot point 1235 as float 1230 falls (1208A) with water level 1205 to stop applying pressure to fill valve actuator 1276. Unlocking fill valve actuator 1276 may cause fill valve actuator 1276 to transition) to an open position (as float 1230 falls (1208A) with water level 1205) allowing liquid to fill the cistern.

As illustrated in FIG. 12C, fill valve 1270 may attempt to fill cistern 1202. Liquid 1242 may flow from diverter 1280 into leaky container 1240 at a rate that is greater than liquid 1244 flowing out of leaky container 1240. The differential flow of liquid in (1242) and liquid out (1244) of leaky container 1240 may cause leaky container 1240 to gain weight. Leaky container 1240 gaining weight may cause beam 1220 to rotate (1228B). Rotation (1228B) may cause shelf 1223 to move. Shelf 1223 moving may cause arm 1260 to move from the second resting position back to the first resting position. Arm 1260 moving from the second resting position back to the first resting position may cause engagement portion 1269 to lock engagement lever 1290 such that pressing portion 1299 of engagement lever 1290 presses against fill valve actuator 1267 to hold fill valve 1270 in a closed position. Arm 1260 may be weighted to overcome the weight of the float and a closing force of the fill valve actuator 1276. Fill valve 1270 being in a closed position may cause the flow of liquid 1242 from diverter 1280 into leaky container 1240 to cease. Fill valve 1270 being in a closed position may cause the flow of liquid into the cistern to cease. Liquid 1244 may continue to flow out of leaky container 1240 until leaky container is substantially void of liquid 1242. In summary, these actions may relock fill valve 1270 in a closed position to prevent a continuous leak of the cistern 102.

As illustrated in FIG. 12C, the fill valve 1270 may attempt to fill the cistern. When the cistern is not leaking, the water level 1205 may rise (1208B). The water level 1205 rising (1208B) may cause float 130 to rise up. Float 130 rising may cause engagement lever 1290 to pivot about linkage lever pivot point 1235. Engagement lever 1290 pivoting about linkage lever pivot point 1235 as float 1230 rises may cause pressing portion 1299 to apply pressure to fill valve actuator 1276. Pressure applied to fill valve actuator 1276 may cause fill valve actuator 1267 to transition into a closed position. Fill valve actuator 1267 transitioning from an open position to a closed position may stop the flow of liquid into the cistern.

As illustrated in FIG. 12C, fill valve 1270 may be locked into a closed position preventing further liquid being fed into the cistern until the next flushing cycle. Liquid 1242 may flow from diverter 1280 into leaky container 1240 at a rate that is greater than liquid 1244 flowing out of leaky container 1240. The differential flow of liquid in (1242) and liquid out (1244) of leaky container 1240 may cause leaky container 1240 to gain weight. Leaky container 1240 gaining weight may cause beam 1220 to rotate (1228B). Rotation (1228B) may cause shelf 1223 to move. Shelf 1223 moving may cause arm 1260 to move from the second resting position back to the first resting position. Arm 1260 moving from the second resting position back to the first resting position may cause engagement portion 1269 to lock engagement lever 1290 such that pressing portion 1299 of engagement lever 1290 presses against fill valve actuator 1267 to hold fill valve 1270 in a closed position. Fill valve 1270 being in a closed position may cause the flow of liquid 1242 from diverter 1280 into leaky container 1240 to cease.

Fill valve 1270 being in a closed position may cause the flow of liquid into the cistern to cease. Liquid 1244 may continue to flow out of leaky container 1240 until leaky container is substantially void of liquid 1242. When cistern 1202 is leaking, the water level 1205 may not rise as described previously. In this case, float 1230 may not rise. However, this locking mechanism may force while the fill valve 1270 into a closed position again. In summary, these actions may relock fill valve 1270 in a closed position to prevent a continuous leak of the cistern 102.

According to an embodiment, the engagement support 1294 may be disposed on a to a strap 1298 configured to circumnavigate a vertical portion of the fill valve 1270. According to an embodiment, arm 1260 may be connected to engagement support 1294 at arm pivot point 1265. According to an embodiment, the engagement support 1294 may be disposed on a cap configured to be disposed on fill valve 1270. According to an embodiment, arm 1260 may be connected to engagement support 1294 disposed on a cap configured to be disposed on fill valve 1270 at arm pivot point 1265. A cap embodiment may be configured to adapt, reconfigure, and/or convert a fill valve (e.g. 1270) act as: for example, arm (e.g. 1260) support, beam support (e.g. 124), engagement support 1294, combinations thereof, and/or the like.

Figure 13A:
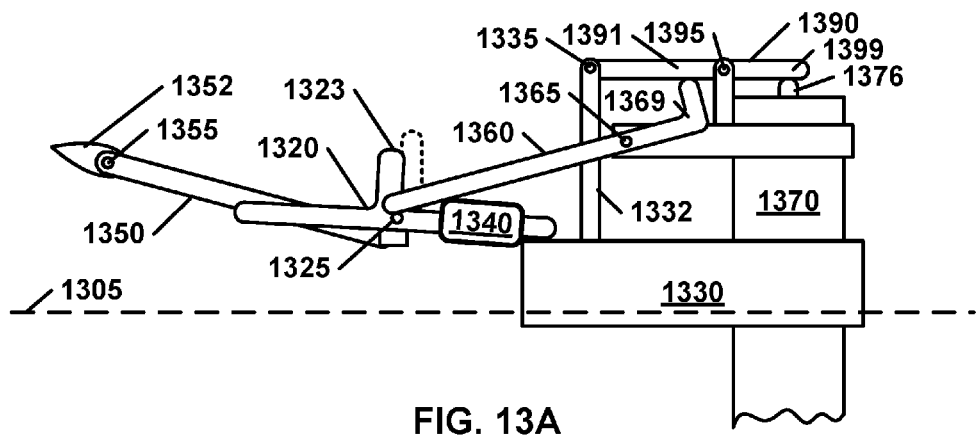
FIG. 13A is an example illustration of a front view of a fill valve switch trigger and locking mechanism employing a fill valve moving float and counter-balance in a nominal position as per an aspect of an embodiment of the present invention.
Figure 13B:
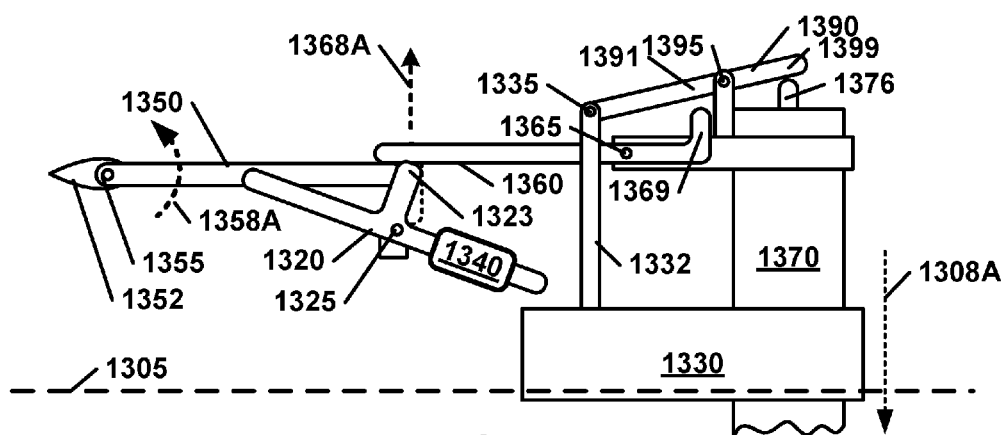
FIG. 13B is an example illustration of a front view of a fill valve switch trigger and locking mechanism employing a fill valve moving float and counter-balance in a flushing position as per an aspect of an embodiment of the present invention.
Figure 13C:
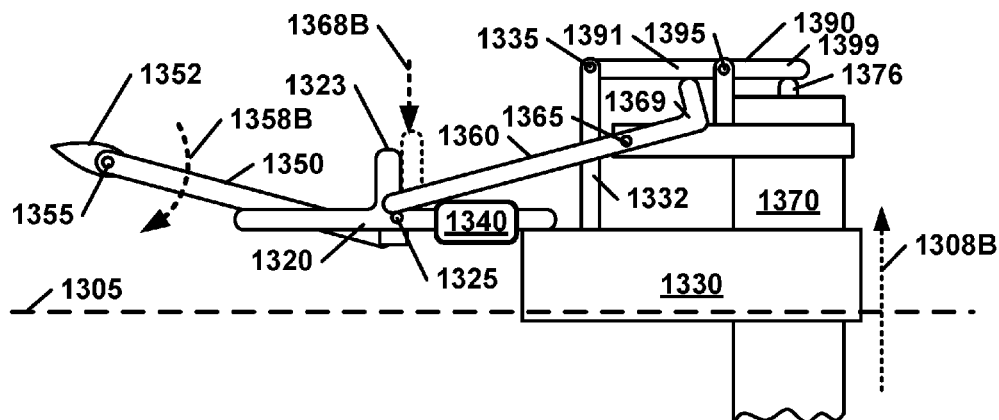
FIG. 13C is an example illustration of a front view of a fill valve switch trigger and locking mechanism employing a fill valve moving float and counter-balance in a recently filled position as per an aspect of an embodiment of the present invention.

FIG. 13A is an example illustration of a front view of a fill valve switch trigger and locking mechanism employing a fill valve 1370 moving float 1330 and a weight 1340 in a nominal position. FIG. 13B is an example illustration of a front view of a fill valve switch trigger and locking mechanism employing a fill valve 1370 moving float 1330 and weight 1340 in a flushing position. FIG. 13C is an example illustration of a front view of a fill valve switch trigger and locking mechanism employing a fill valve 1370 moving float 1330 and weight 1340 in a recently filled position. As illustrated in example FIGS. 13A, 13B, 13C, float 1330 may be movably connected to fill valve 1370. Float 1330 me be configured to contact beam 1320 when float 1330 is in a raised position.

According to an embodiment, the apparatus may comprise an engagement mechanism controlled by an engagement portion 1369 of arm 1360. The engagement mechanism may comprise an engagement support 1394 and an engagement lever 1390. The engagement support 1394 may be offset from fill valve actuator 1376. The engagement support 1394 may be connected to a strap 1398 configured to circumnavigate a vertical portion of the fill valve 1370. The engagement lever 1390 may be connected to the engagement support 1394 at an engagement pivot point 1395. The engagement lever 1390 may comprise a pressing portion 1399 and a locking portion 1391. The pressing portion 1399 may be disposed on the fill valve actuator 1376 side of the engagement pivot point 1395. The locking portion 1391 may be configured to limit the pressing portion 1399 from applying a sufficient amount of force to change the position of the fill valve actuator 1376 through contact with the engagement portion 1369. The engagement lever 1390 may be connected to float 1330 via a linkage 1332. Linkage 1332 may connect to engagement lever 1390 at a linkage lever pivot point 1335.

According to an embodiment, the locking portion 1391 may be configured to contact the engagement portion 1369 from below. Embodiments may be configured such that the locking portion 1391 may be configured to contact the engagement portion 1369 from above. Embodiments may be configured such that the locking portion 1391 may be configured to contact the engagement portion 1369 through an intermediary linkage.

As shown in FIG. 13A, a cistern is in a nominal filled flush ready position. Float 1330, resting on water level 1305, may cause engagement lever 1390 (via a pivot about linkage lever pivot point 1335) to apply pressure to fill valve actuator 1376 via pressing portion 1399. Pressure applied to fill valve actuator 1376 may hold fill valve 1370 in a closed position, preventing fill valve 1370 from delivering additional water into the cistern.

Beam 1320 may be in a first position. The first position may be the result of float 1330 contacting (directly and/or indirectly) beam 1320. Beam 1320 may have a weight distribution causing beam to have a default position leaning down towards float 1330. The weight distribution may be applied, at least in part, by a weight 1340. Weight 1340 may be a fixed weight, a variable weight, a combination thereof, and/or the like. A variable weight may vary as result of a liquid entering and/or exiting a leaky container, a weight on a slide, a combination thereof, and/or the like. Arm 1360 may be in a first resting position, which in this example, has arm 1360 resting on beam 1320. In this position, locking portion 1369 of arm 1360 may lock fill valve actuator 1376 in a closed position by preventing engagement lever 1390 from pivoting about linkage lever pivot point 1335 to apply pressure to fill valve actuator 1376. This locking position may prevent fill valve 1370 from delivering additional water into the cistern.

As illustrated in FIG. 13B, flush handle 1352 has been pivoted about flush handle pivot point 1355 to cause lifting arm 1350 to rotate (1358A). Rotation (1358A) may cause lift arm 1350 to lift (1368A) arm 1360 out of the way of shelf 1323. Water level 1305 dropping (1308A) may cause float 1330 to drop. Float 1330 dropping may cause beam 1323 to rotate (1328A) about beam pivot point 1325 to place shelf 1323 below arm 1360. Releasing flush handle 1352 may cause arm 1360 to settle in a second rest position on shelf 1323. Arm 1360 in the second rest position may unlock fill valve actuator 1376 by allowing engagement lever 1390 to pivot about linkage lever pivot point 1335 as float 1330 falls (1308A) with water level 1305 to stop applying pressure to fill valve actuator 1376. Unlocking fill valve actuator 1376 may cause fill valve actuator 1376 to transition) to an open position (as float 1330 falls (1308A) with water level 1305) allowing liquid to fill the cistern.

As illustrated in FIG. 13C, fill valve 1370 may attempt to fill cistern 1302. Float 1330 may rise as the cistern fills. Float 1330 rising may cause float 1330 to contact (directly and/or indirectly) beam 1320. The contact of float 1330 with beam 1320 may cause beam 1320 to rotate (1328B). Rotation (1328B) may cause shelf 1323 to move. Shelf 1323 moving may cause arm 1360 to move from the second resting position back to the first resting position. Arm 1360 moving from the second resting position back to the first resting position may cause engagement portion 1369 to lock engagement lever 1390 via pressure with engagement lever 1390 at portion 1391. Pressure applied to portion 1399 may cause pressing portion 1399 of engagement lever 1390 to press against fill valve actuator 1367 to hold fill valve 1370 in a closed position. Fill valve 1370 being in a closed position may the flow of liquid into the cistern to cease. In summary, these actions may relock fill valve 1370 in a closed position to prevent a continuous leak of the cistern 102.

According to an embodiment, the engagement support 1394 may be disposed on a to a strap 1398 configured to circumnavigate a vertical portion of the fill valve 1370. According to an embodiment, arm 1360 may be connected to engagement support 1394 at arm pivot point 1365. According to an embodiment, the engagement support 1394 may be disposed on a cap configured to be disposed on fill valve 1370. According to an embodiment, arm 1360 may be connected to engagement support 1394 disposed on a cap configured to be disposed on fill valve 1370 at arm pivot point 1365. A cap embodiment may be configured to adapt, reconfigure, and/or convert a fill valve (e.g. 1370) act as: for example, arm (e.g. 1360) support, beam support (e.g. 1334), engagement support 1394, combinations thereof, and/or the like.

Figure 14A:
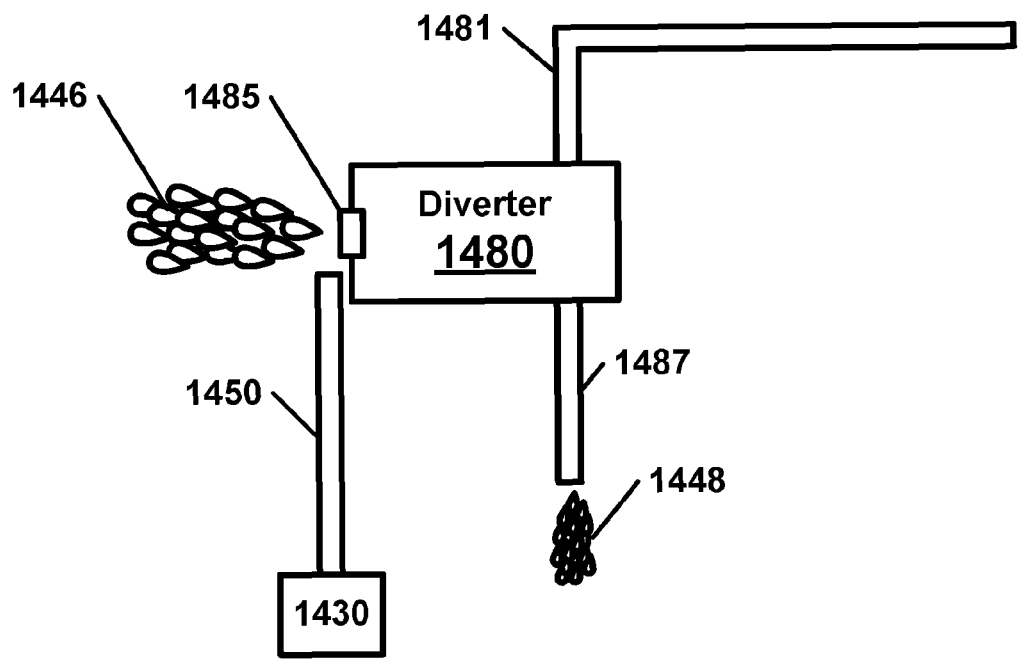
FIG. 14A is an example illustration of an open diverter as per an aspect of an embodiment of the present invention.
Figure 14B:
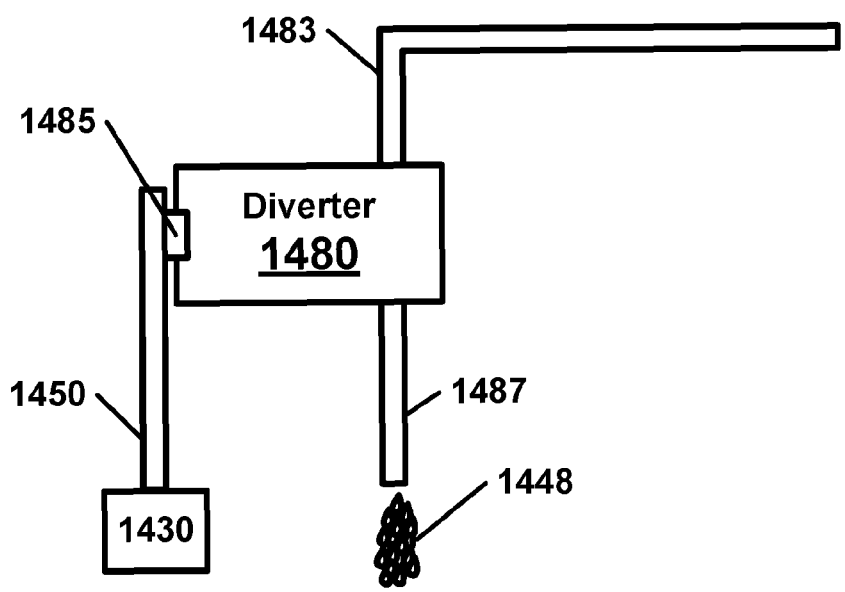
FIG. 14B is an example illustration of an open diverter as per an aspect of an embodiment of the present invention.

FIG. 14A is an example illustration of an open diverter. FIG. 14B is an example illustration of an open diverter. Diverter 1480 may comprise a diverter inlet 1481, a diverter nozzle 1485 and a diverter outlet 1487. Inlet tube may be fluidly connected to diverter nozzle 1485 and a diverter outlet 1487. Under nominal conditions, liquid may flow from diverter inlet 1481 to both a diverter nozzle 1485 and diverter outlet 1487. Nozzle liquid 1446 may be emitted from diverter nozzle 1485. Outlet liquid 1448 may be emitted from diverter outlet 1487. A blocker 1450 may be connected to float 1430. Float 1430 may move based upon a liquid level in a cistern. When the liquid level is below a first predetermined level, the blocker may be moved out of the path of the nozzle liquid 1446, allowing the nozzle liquid 1446 to be emitted from nozzle 1485. When the liquid level is above a second predetermined level, the blocker may be positioned to block the path of the nozzle liquid 1446, preventing the nozzle liquid 1446 from being emitted from nozzle 1485. The first predestined level and second predestined level may be the substantially the same. This embodiment of a diverter is only an example of a diverter. It is envisioned that other diverters may be employed that use other mechanisms to divert liquid from a fill valve. For example, a diverter may employ a valve, a solenoid, a flow restrictor, combinations thereof, and/or the like.

FIG. 15A is an illustration of an example fill valve 1570 with a switch and trigger mechanism in a nominal position. FIG. 15B is an illustration of an example fill valve 1570 with a switch and trigger mechanism in a first flushing position. FIG. 15C is an illustration of an example fill valve 1570 with a switch and trigger mechanism in a second flushing position. FIG. 15D is an illustration of an example fill valve 1570 with a switch and trigger mechanism in a tank fill completion position. FIG. 15E is an illustration of an example fill valve 1570 with a switch and trigger mechanism in a tank leak position.

FIG. 15A is an example illustration of a front view of a fill valve switch trigger mechanism employing a moving float 1530 and a leg 1526 in a nominal position. The leg 1526, in this example embodiment, may extend in the direction of moving float 1530. As illustrated in FIG. 15A, a cistern is in a nominal filled flush ready position. Float 1530, resting on water level 1505, may hold beam 1520 in a first position though contact with a contact portion 1521 of leg 1526. Leg 1526 may be weighted. Beam 1520, leg 1526 and shelf 1523 may be connected and have an overall center of gravity located to the leg side of pivot point 1525. Arm 1560 may be in a first resting position, which in this example, has arm 1560 resting on a portion of the top (and/or cap) of fill valve 1570. In this position, arm 1560 may hold a fill valve actuator in a closed position, preventing a fill valve from delivering additional water into the cistern. The arm 150 may pivot around pivot point 1525. Pivot point 1525 may be connected, for example, to a collar 1524 surrounding a portion of fill valve 1570, a portion of fill valve 1570, and/or the like. Stops 1526 and/or 1527 may be positioned to limit the rotation of arm 1520.

As illustrated in FIG. 15B, flush handle 1552 has been pivoted about flush handle pivot point 1555 to cause lifting arm 1550 to rotate (1558B). Rotation (1558B) may cause lift arm 1550 to lift (1568B) arm 1560 out of the way of shelf 1523. Beam 1520 may be configured so that the balance of beam 1520 is heavier on the contact portion 1521 side of beam 1520 than the opposite beam portion (near, for example, pivot 1525). Water level 1505 dropping (1508B) may cause float 1530 to drop. Float 1530 dropping may cause beam 1520 to rotate (1528B) about beam pivot point 1525 to place shelf 1523 below arm 1560.

FIG. 15C illustrates flush handle 1552 being released, allowing arm 1560 to settle via movement 1568C in a second rest position on shelf 1523. Arm 1560 in the second rest position may hold the fill valve actuator in an open position allowing liquid to enter the cistern. At this point, water level 1505 may still be transitioning from going down to rising (1508C). The timing of this may vary depending upon, for example, the length of time lifting arm 1550 is rotated and speed at which liquid evacuated the tank.

As illustrated in FIG. 15D, the fill valve may attempt to fill the cistern. When the cistern is not leaking, the water level 1505 may rise (1508D). The water level 1505 rising (1508D) may cause float 1530 to rise. Float 1530 cause beam 1520 to rotate (1528D) when float 1530 contacts the contact portion 1521 of leg 1526. Rotation (1528D) may cause shelf 1523 to move. Shelf 1523 moving may cause arm 1560 to move (1568D) from the second resting position to the first resting position. Arm 1560 moving from the second resting position to the first resting position may cause the fill valve actuator to transition from an open position to a closed position. The fill valve actuator transitioning from an open position to a closed position may stop the flow of liquid into the cistern. The Cistern may be back in a nominal filled flush ready position.

As illustrated in FIG. 15E, the water level 1505 may decrease in the tank due to a leak. Moving float 1530 may drop (1508E) as water level 1505 decreases. However, arm 1560 may still be positioned to hold a fill valve actuator in a closed position, preventing fill valve 1570 from delivering additional water into the cistern.

FIG. 16A to 16D illustrate an embodiment that employs momentum caused by the evacuation of liquid from a cistern to set a trigger mechanism. FIG. 16A is an illustration of an example fill valve 1670 with a switch and trigger mechanism in a nominal position. FIG. 16B is an illustration of an example fill valve 1670 with a switch and trigger mechanism in a flushing position. FIG. 16C is an illustration of an example fill valve 1670 with a switch and trigger mechanism in a second flushing position. FIG. 16D is an illustration of an example fill valve 1670 with a switch and trigger mechanism in a tank fill completion position.

FIG. 16A is an example illustration of a front view of a fill valve switch trigger mechanism employing a moving float 1630 and a leg 1626 in a nominal position. The leg 1626, in this example embodiment, may extend in the direction of moving float 1630. As illustrated in FIG. 16A, a cistern is in a nominal filled flush ready position. Float 1630, resting on water level 1605, may hold beam 1620 in a first position though contact with a contact portion 1621 of leg 1626. Leg 1626 may be weighted. Arm 1660 may be in a first resting position, which in this example, has arm 1660 resting on a portion of the top (and/or cap) of fill valve 1670. In this position, arm 1660 may hold a fill valve actuator in a closed position, preventing a fill valve from delivering additional water into the cistern. The arm 1660 may pivot around pivot point 1625. Pivot point 1625 may be connected, for example, to a collar 1624 surrounding a portion of fill valve 1670, a portion of fill valve 1670, and/or the like. Stop 1626 may be positioned to limit the rotation of arm 1620.

As illustrated in FIG. 16B, the cistern has been flushed causing the water level 1605 to drop (1608B). Beam 1620 may be configured so that the balance of beam 1620 is heavier on the contact portion 1621 side of beam 1620 than the opposite beam portion (near, for example, pivot 1625). The water level 1605 dropping (1608B) may cause float 1630 to drop. Float 1630 dropping may cause beam 1620 to rotate (1628B) about beam pivot point 1625. Beam 1620 may develop momentum as it rotates. Shelf 1623 may have an edge 1629 that may edge under arm 1660 causing arm 1660 to rise (1668B).

FIG. 16C illustrates arm 1660 settled in a second rest position on shelf 1623. Arm 1660 in the second rest position may hold the fill valve actuator in an open position allowing liquid to fill the cistern. At this point, water level 1605 may start rising (1608C) as the fill valve attempts to fill the cistern.

As illustrated in FIG. 16D, the fill valve may continue attempting to fill the cistern. When the cistern is not leaking, the water level 1605 may continue to rise (1608D). The water level 1605 rising (1608D) may cause float 1630 to rise. Float 1630 rising may cause beam 1620 to rotate (1628D) when float 1630 contacts the contact portion 1621 of leg 1626. Rotation (1628D) may cause shelf 1623 to move. Shelf 1623 moving may cause arm 1660 to move (1668D) from the second resting position to the first resting position. Arm 1660 moving from the second resting position to the first resting position may cause the fill valve actuator to transition from an open position to a closed position. The fill valve actuator transitioning from an open position to a closed position may stop the flow of liquid into the cistern. The Cistern may be back in a nominal filled flush ready position.

If the water level 1605 decreases in the tank due to a leak. Moving float 1630 may drop as water level 1605 decreases. However, arm 1660 may still be positioned to hold a fill valve actuator in a closed position, preventing fill valve 1670 from delivering additional water into the cistern.

FIG. 17A and FIG. 17B illustrate an embodiment of a backup closer as per an aspect of the disclosure. The backup closer may transition to (and/or maintain) the fill valve 1770 in a closed position. FIG. 17A is an illustration of an example fill valve 1770 with arm 1760 in a second rest position on shelf 1723. Arm 1760 in the second rest position may hold the fill valve 1770 actuator in an open position allowing the fill valve to attempt to fill a cistern. At this point, assuming there is not a leak with a flow greater than the flow of liquid from the fill valve 1770, the water level 1705 may start rising (1708C) as the fill valve attempts to fill the cistern. In this example embodiment, a beam 1720 may comprise a pull-down portion 1739 on the opposite side of pivot point 1725 of a weighted portion (e.g. 1726). A flexible linkage may connect the pull-down portion 1739 with float 1730. Examples of linkage 1738 comprise: and a length of nylon filament, chain, string, and/or the like. Linkage 1738 may comprise one or more rigid portions connected by one or more joints. As illustrated in this example, arm 1760 may rest on shelf 1723 when: (1) the float 1730 is not causing shelf 1773 to be positioned away from under arm 1760; and (2) there is slack in linkage 1738. As illustrated in example FIG. 17B, if there is a leak (and/or other cause) that would prevent the float from releasing the trigger mechanism, the linkage may become taught as float 1730 drops. This may cause the linkage to pull down on the pull-down portion, further causing beam 1720 to rotate about pivot point 1725 moving shelf 1723 out from under arm 1760.

Float 1730 dropping may cause beam 1720 to rotate (1728) about beam pivot point 1725. Rotation (1728) may cause shelf 1723 to move. Shelf 1723 moving may cause arm 1760 to move (1768) from a second resting position to a first resting position. Arm 1760 moving from the second resting position to the first resting position may cause the fill valve actuator to transition from an open position to a closed position. The fill valve actuator transitioning from an open position to a closed position may prevent the flow of liquid into the cistern. Arm 1760 may now be positioned in the first resting position causing fill valve actuator to maintain a closed position, preventing fill valve 1770 from delivering additional water into the cistern.

It is envisioned that employing a linkage between a beam and float may be employed in multiple embodiments beyond the example illustrated in FIGS. 17A and 17B. For example, in FIG. 10, a linkage may be created between counterbalance 1041 and float 1030. The water level 1005 dropping may cause float 1030 to drop. Float 1030 dropping may cause beam 1020 to rotate. The rotation may cause shelf 1023 to move. Shelf 1023 moving may cause arm 1060 to move from the second resting position to the first resting position. Arm 1060 moving from the second resting position to the first resting position may cause the fill valve actuator to transition from an open position to a closed position. The fill valve actuator transitioning from an open position to a closed position may stop the flow of liquid into the cistern.

Figures 18A, 18B:
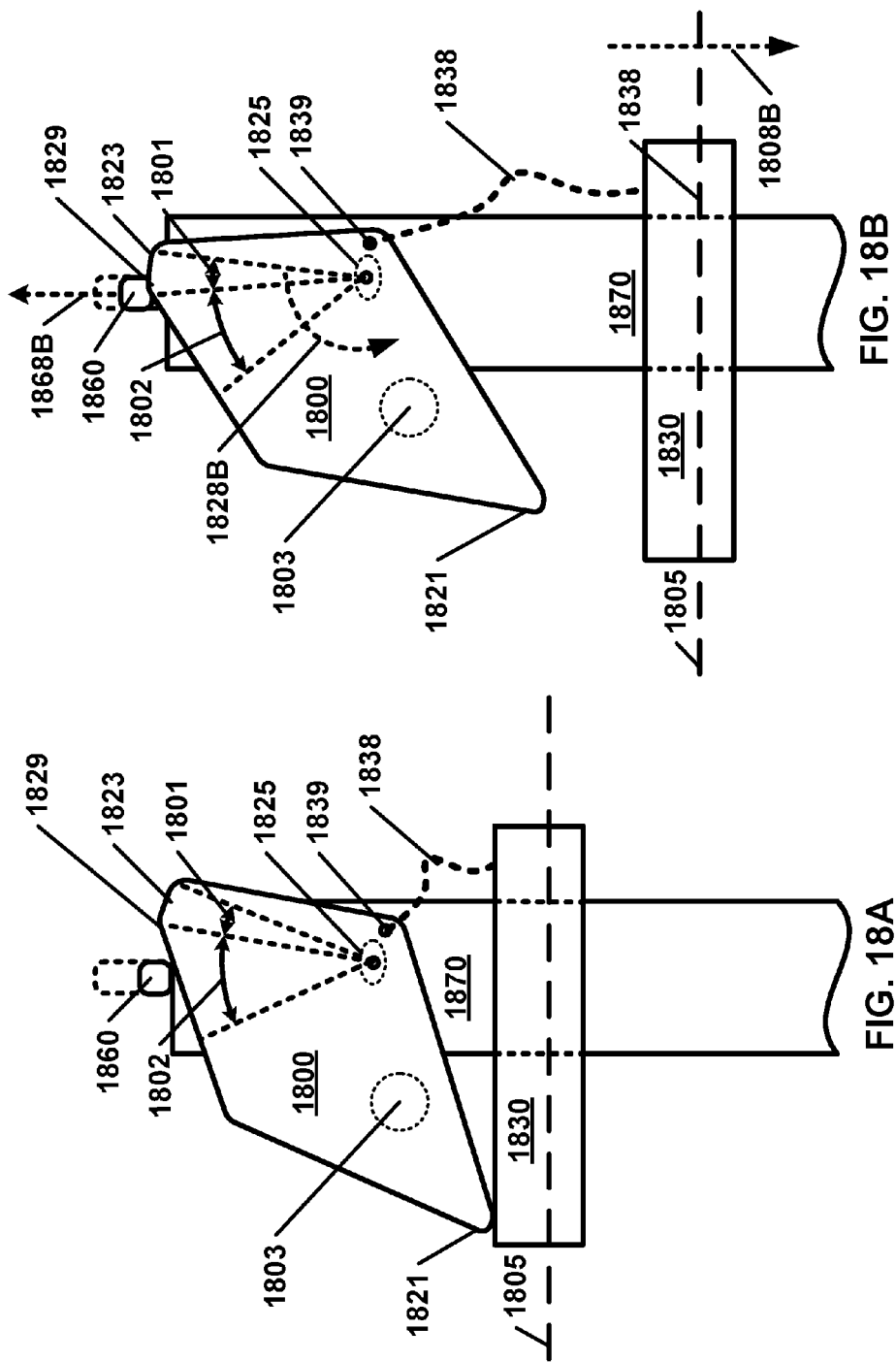
FIG. 18A is an illustration of an example fill valve with a switch and trigger mechanism in a nominal position.
FIG. 18B is an illustration of an example fill valve with a switch and trigger mechanism in a flushing position.

FIG. 18A to 18D illustrate an example embodiment, with a backup closing mechanism, that may employ momentum caused by the evacuation of liquid from a cistern to set a trigger mechanism. FIG. 18A is an illustration of an example fill valve 1870 with a switch and trigger mechanism in a nominal position. FIG. 18B is an illustration of an example fill valve 1870 with a switch and trigger mechanism in a flushing position. FIG. 18C is an illustration of an example fill valve 1870 with a switch and trigger mechanism in a second flushing position. FIG. 18D is an illustration of an example fill valve 1870 with a switch and trigger mechanism in a tank fill completion position. FIG. 18E is an illustration of an example fill valve 1870 with a switch and trigger mechanism in a backup closed position.

As illustrated in FIG. 18A, an embodiment may comprise a shelf 1800. Shelf 1800 may be arranged to pivot about a pivot zone 1825 of shelf 1800. Shelf 1800 may have a center of gravity 1803 offset from the pivot zone 1825. According to an embodiment, at least a part of shelf 1800 may be weighted. The weighted part of shelf 1800 may be located to position the center of gravity 1803 of shelf 1800 to a position that may be offset from pivot zone 1825. The weighting may add and/or remove material from various parts of shelf 1800. The weighting may be due the geometry of shelf 1800. The weighting may be due to variations of density of shelf 1800. The weighting may be due to variations in thickness of areas of the shelf 1800.

Shelf 1800 may have a first angular range 1801 mechanically configured to situate a linkage 1860 in a valve activation position. The valve activation position may cause, for example, a valve 1870 to pass liquid from an inlet to an outlet. Shelf 1800 may have a second angular range 1802 mechanically configured to situate the linkage 1860 in a valve de-activation position. The valve deactivation position may prevent a valve 1870 from passing liquid from an inlet to an outlet. The second angular range 1801 may be different from the first angular range 1802. At least one of the first angular range 1801 and the second angular range 1802 may comprise a range of less than forty-five degrees. The first angular range 1801 may be less than the second angular range 1802.

According to an embodiment, the linkage 1860 may comprise an arm extending over a valve actuator on valve 1870. According to an embodiment, linkage 1860 may comprise an arm arranged to be lifted by a lifting arm. It is envisioned that other linkages may be employed that translate a position of shelf 1800 with a valve actuation device of a valve 1870.

An interaction portion 1821 may be mechanically configured to urge the shelf 1800 from the first angular range 1801 to the second angular range 1802 by a float 1830 moving in a first direction. The interaction portion 1821 may be disposed on and/or relative to shelf 1800. For example, the interaction portion 1821 may be disposed to a surface area of shelf 1800. In another example, the interaction portion 1821 may be disposed on a leg of shelf 1800. In yet another example, the interaction portion 1821 may be disposed on a protrusion of shelf 1800. In a further example, the interaction portion 1821 may be disposed on a void of shelf 1800.

According to an embodiment, the pivot zone 1825 may comprise a pivot point. The pivot zone 1825 may be stationary relative to a fill valve 1870. The pivot zone 1825 may be a pivot point. The pivot point may be a point about which the shelf 1800 pivots, for example, a bolt, a stud, a bearing, a screw, a dowel, a combination thereof, and/or the like. According to an embodiment, the pivot zone 1825 may have other shapes. For example, the pivot zone 1825 may comprise a void such as, for example, a slit. The pivot zone may comprise a void that is arranged to cause the shelf 1800 to rotate in a rocking motion. The pivot zone 1825 may comprise a curved void. A void in the pivot zone 1825 may be arranged to move about a member positioned relative to, and/or integral to the fill valve 1870. According to an embodiment, the pivot zone 1825 may comprise a member that extends outward. The outward extending member may be arranged to move about, for example, an external guide, a void in an external support, a divot in an eternal support, a combination thereof, and/or the like. The external support may comprise a part of valve 1870, a strap coupled to valve 1870, a combination thereof, and/or the like.

According to an embodiment, the shelf 1801 may comprise a linkage movement area 1829 shaped to urge the linkage 1860 from the valve deactivation position to the valve activation position when the shelf 1800 rotates from the second angular range 1802 to the first angular range 1801. According to an embodiment, as the shelf 1800 rotates from the second angular range 1802 to the first angular range 1801, the linkage movement area 1829 may be mechanically configured to slide under linkage 1860 and urge it from valve deactivation position to the valve activation position. According to another embodiment, the linkage movement area 1829 may be mechanically configured to move linkage 1860 via a coupling. The coupling may comprise one or more mechanisms to redirect a first motion of a first element (e.g. linkage movement area 1829) to a second motion of a second element (e.g. linkage 1860). A coupling may comprise, for example, a pin, a cam, a flexible member, a hinge, a slide, a combination thereof, and/or the like.

According to an embodiment, the valve 1870 may comprise a fill valve. The float 1830 may comprise a cistern float. The float 1830 may comprise a mechanism that moves with the level of a material. The material may move through the valve 1870. According to an embodiment, a valve (e.g. 1870) and float (e.g. 1830) may be arranged to fill and/or empty a volume other than a cistern. For example, an embodiment may employ a valve 1870 and float 1830 to maintain a level of a flowable material in a container. Examples of flowable materials comprise oil, water, paint, sand, combinations thereof, and/or the like.

As illustrated in FIG. 18B, the shelf 1800 may be mechanically configured to rotate (1828B) from the second angular range 1802 to the first angular range 1801 by a righting momentum achieved by the shelf 1800 rotating about the pivot zone 1825 after the float 1830 is moved in a second direction 1808D. In yet another embodiment, the shelf 1800 may be mechanically configured to rotate (1828B) from the second angular range 1802 to the first angular range 1801 by a righting momentum achieved by the shelf 1800 rotating (1868D) about the pivot zone 1825 after the linkage 1860 is moved from the path of the shelf 1800. The linkage may be moved by various techniques, including, for example, a flush arm, a solenoid, a pull chain, a combination thereof, and/or the like. As illustrated in FIG. 18D, the shelf 1800 may be mechanically configured to rotate (1828D) about the pivot zone 1825 from the second angular range 1802 to the first angular range 1801 by moving (1868D) the linkage 1860 from the path of the shelf 1800.

FIG. 18A is an illustration of an example fill valve 1870 with a switch and trigger mechanism in a nominal position. Float 1830, resting on water level 1805, may hold shelf 1800 in a first position though contact with interaction portion 1821. Shelf 1800 may have a center of gravity 1803 offset from pivot zone 1825 to cause interaction portion 1821 to favor a downward position when shelf 1800 is able to freely rotate about pivot zone 1825. Linkage 1860 may be in a first resting position, which in this example, has linkage 1860 resting on a portion of the top (and/or cap) of fill valve 1870. In this position, linkage 1860 may hold a fill valve actuator in a closed position, preventing a fill valve from delivering additional water into, for example, a cistern. Shelf 1800 may pivot around pivot zone 1825. Pivot zone 1825 may be connected, for example, to a collar surrounding a portion of fill valve 1870, a portion of fill valve 1870, and/or the like. A stop may be positioned to limit the rotation of shelf 1800. A second linkage 1838 may be connected between the float 1830 and the shelf 1800. In this illustrated configuration, second linkage 1838 may be slack.

As illustrated in FIG. 18B, a cistern may have been flushed causing the water level 1805 to drop (1808B). Shelf 1800 may be mechanically configured so that the balance of shelf 1800 is heavier on the interaction portion 1821 side of pivot portion 1825. The water level 1805 dropping (1808B) may cause float 1830 to drop. Float 1830 dropping may cause shelf 1800 to rotate (1828B) about pivot zone 1825. Shelf 1800 may develop momentum as it rotates. Shelf 1800 may have a linkage movement area 1829 that may edge under linkage 1860 causing linkage 1860 to move (1868B).

FIG. 18C illustrates linkage 1860 settled in a second rest position on a support area 1823 of shelf 1823. Linkage 1860 in the second rest position may hold the fill valve actuator in an open position allowing liquid to fill the cistern. At this point, water level 1805 may start rising (1808C) as the fill valve attempts to fill the cistern.

As illustrated in FIG. 18D, the fill valve may continue attempting to fill the cistern. When the cistern is not leaking, the water level 1805 may continue to rise (1808D). The water level 1805 rising (1808D) may cause float 1830 to rise. Float 1830 rising may cause shelf 1800 to rotate (1828D) when float 1830 contacts the interaction portion 1821 of shelf 1800. Rotation (1828D) may cause support area of shelf 1823 to move. Support area 1823 of shelf 1823 moving may cause linkage 1860 to move (1868D) from the second resting position to the first resting position. Linkage 1860 moving from the second resting position to the first resting position may cause the fill valve actuator to transition from an open position to a closed position. The fill valve actuator transitioning from an open position to a closed position may stop the flow of liquid into the cistern. The Cistern may be back in a nominal filled flush ready position.

If the water level 1805 decreases in the tank due to a leak. Float 1830 may drop as water level 1805 decreases. However, linkage 1860 may still be positioned to hold a fill valve actuator in a closed position, preventing fill valve 1870 from delivering additional water into the cistern.

According to an embodiment, a shelf 1800 may be mechanically configured with an additional mechanism to situate the linkage 1860 in a valve de-activation position in case a leak (or other cause) prevents the float from rising to a sufficient level to place the linkage 1860 in a valve de-activation position. As illustrated in FIG. 18E, the shelf 1800 may be coupled to the float 1830 by a second linkage 1838. The second linkage 1838 may be disposed between the float 1830 and portion of the shelf 1800 on an opposing side of the pivot zone 1825 from the center of gravity 1803. As illustrated in FIG. 18E, second linkage 1838 may rotate (1828E) the shelf 1800 from the first angular range 1801 to the second angular range 1802 when the float 1803 moves in the second direction (1808E) by, for example, a sufficient amount to cause second linkage 1838 to exceed a threshold. This motion (1828E) may allow the linkage 1860 to move (1868E) from the valve activation position to the valve de-activation position.

Linkage 1860 in the second rest position may hold the fill valve 1870 actuator in an open position allowing the fill valve to attempt to fill a cistern. At this point, assuming there is not a leak with a flow greater than the flow of liquid from the fill valve 1870, the water level 1805 may start rising (e.g. 1808C) as the fill valve attempts to fill the cistern. In this example embodiment, shelf 1800 may comprise a pull-down portion 1839 on the opposite side of pivot zone 1825 of center of gravity 1803. Second linkage 1836 may connect the pull-down portion 1839 with float 1830. Second linkage 1836 may be a flexible linkage. Examples of linkage 1838 comprise: a length of filament, a chain, a string, and/or the like. Linkage 1838 may comprise one or more rigid portions connected by one or more joints. As illustrated in this example, linkage 1860 may rest on support portion 1823 of shelf 1800 when: (1) the float 1830 is not causing support portion 1823 of shelf 1800 to be positioned away from under linkage 1860; and (2) there is slack in linkage 1838. As illustrated in example FIG. 18E, if there is a leak (and/or other cause) that would prevent float 1830 from releasing the disclosed mechanism, second linkage 1838 may become taught as float 1830 drops. This may cause the second linkage 1838 to pull down on the pull-down portion 1839 of shelf 1800, further causing Shelf 1800 to rotate about pivot zone 1825 moving support portion 1823 of shelf 1800 out from under linkage 1860.

Float 1830 dropping may cause shelf 1800 to rotate (1828E) about pivot zone 1825. Rotation (1828E) may cause shelf 1800 to move. Shelf 1800 moving may cause linkage 1860 to move (1868E) from a second resting position to a first resting position. Linkage 1860 moving from the second resting position to the first resting position may cause the fill valve actuator to transition from an open position to a closed position. The fill valve actuator transitioning from an open position to a closed position may prevent the flow of liquid into the cistern. Linkage 1860 may now be positioned in the first resting position causing fill valve actuator to maintain a closed position, preventing fill valve 1870 from delivering additional water into the cistern.

In this specification, "a" and "an" and similar phrases are to be interpreted as "at least one" and "one or more." References to "an" embodiment in this disclosure are not necessarily to the same embodiment.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) preventing leakage from a toilet. However, one skilled in the art will recognize that embodiments of the invention could be employed to prevent the flow of liquid in water tanks, aquariums, in rain barrels, and liquid collection and/or dispensing systems.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. An apparatus, comprising:
   a valve comprising a valve actuator;
   a shelf; and
   a linkage extending from the valve actuator towards the shelf; and
   wherein the shelf:
      is arranged to pivot about a pivot zone of the shelf;
      has a center of gravity offset from the pivot zone;
      has a first angular range about the pivot zone mechanically configured to situate the linkage in a valve activation position that places the valve in an open position;
      has a second angular range about the pivot zone mechanically configured to situate the linkage in a valve de-activation position that places the valve in a closed position; and
      has an interaction portion mechanically configured to urge the shelf from the first angular range to the second angular range by a float moving in a first direction; and
   wherein the center of gravity is positioned to bias the shelf toward the first angular range when:
      the linkage is moved away from the shelf so that the linkage no longer contacts the shelf; and
      the shelf is able to freely rotate about the pivot zone.

2. The apparatus of claim 1, wherein the shelf is mechanically configured to rotate from the second angular range to the first angular range by a righting momentum achieved by the shelf rotating about the pivot zone after the float is moved in a second direction.

3. The apparatus of claim 1, further comprising a second linkage between the float and the shelf arranged to rotate the shelf from the first angular range to the second angular range when the float moves in a second direction.

4. The apparatus of claim 1, further comprising a second linkage between the float and portion of the shelf on an opposing side of the pivot zone from the center of gravity.

5. The apparatus of claim 1, wherein the first angular range is different from the second angular range.

6. The apparatus of claim 1, wherein at least one of the first angular range and the second angular range comprises a range of less than forty-five degrees.

7. The apparatus of claim 1, wherein the first angular range is less than the second angular range.

8. The apparatus of claim 1, wherein the pivot zone comprises a pivot point.

9. The apparatus of claim 1, wherein the pivot zone comprises a slit.

10. The apparatus of claim 1, wherein the shelf has a linkage moving zone shaped to urge the linkage from valve de-activation position to the valve activation position when the shelf rotates from the second angular range to the first angular range.

11. The apparatus of claim 1, wherein the valve is a fill valve.

12. The apparatus of claim 1, wherein the float is a cistern float.

13. The apparatus of claim 1, wherein the valve activation position causes the valve to pass liquid from an inlet to an outlet.

14. The apparatus of claim 1, wherein the valve de-activation position prevents the valve from passing liquid from an inlet to an outlet.

15. The apparatus of claim 1, wherein the linkage comprises an arm extending over the valve actuator on the valve.

16. The apparatus of claim 1, wherein the linkage comprises an arm arranged to be lifted by a lifting arm.

17. The apparatus of claim 1, wherein the interaction portion is disposed on a leg of the shelf.

18. The apparatus of claim 1, wherein at least a part of the shelf is weighted.

* * * * *